(12) United States Patent
Wang et al.

(10) Patent No.: US 11,777,656 B2
(45) Date of Patent: Oct. 3, 2023

(54) GROUP ADDRESSED FRAME DELIVERY OVER MULTI-LINK SYSTEMS

(71) Applicant: Apple Inc., Cupertino, CA (US)

(72) Inventors: Qi Wang, Sunnyvale, CA (US); Yong Liu, Campbell, CA (US); Jarkko Lauri Sakari Kneckt, Los Gatos, CA (US); Jinjing Jiang, San Jose, CA (US); Yoel Boger, Shoham (IL); Guoquing Li, Cupertino, CA (US); Tianyu Wu, Fremont, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/544,781

(22) Filed: Dec. 7, 2021

(65) Prior Publication Data

US 2022/0182184 A1    Jun. 9, 2022

Related U.S. Application Data

(60) Provisional application No. 63/122,389, filed on Dec. 7, 2020.

(51) Int. Cl.
*H04L 1/1607* (2023.01)
*H04L 1/1867* (2023.01)
*H04W 76/15* (2018.01)
*H04W 72/12* (2023.01)

(52) U.S. Cl.
CPC .......... *H04L 1/1621* (2013.01); *H04L 1/1874* (2013.01); *H04L 1/1887* (2013.01); *H04L 1/1893* (2013.01); *H04W 72/12* (2013.01); *H04W 76/15* (2018.02)

(58) Field of Classification Search
CPC ... H04L 1/1621; H04L 1/1874; H04L 1/1887; H04L 1/1893; H04L 47/34; H04W 76/00
See application file for complete search history.

(56) References Cited

U.S. PATENT DOCUMENTS

| | | | |
|---|---|---|---|
| 2007/0162813 A1* | 7/2007 | Nakashima | H04L 1/1607 714/749 |
| 2020/0396568 A1* | 12/2020 | Huang | H04W 76/40 |
| 2022/0022127 A1* | 1/2022 | Chu | H04W 48/16 |
| 2022/0247691 A1* | 8/2022 | Xu | H04L 47/34 |

* cited by examiner

*Primary Examiner* — Mohamed A Kamara
(74) *Attorney, Agent, or Firm* — Fish & Richardson P.C.

(57) ABSTRACT

Embodiments may relate to group addressed frame delivery over multi-link systems. Systems and methods are configured for identifying, by an access point (AP) multilink device (MLD) in a wireless network, a first sequence number space (SNS) that is to be used by the AP MLD to transmit data to a non-AP MLD over a first communications link and a second communications link, wherein frames with identical data that are transmitted over the first and second communications links will have an identical first SN based on the first SNS; identifying, by the MLD in the wireless network, the first SN based on the first SNS; and transmitting, by the AP MLD in the wireless network, a frame that includes the data to the non-AP MLD based on the first SN.

19 Claims, 17 Drawing Sheets

1300

Identifying by an access point (AP) multilink device (MLD) in a wireless network, a data frame that is to be transmitted to a plurality of non-AP MLDs subject to a groupcast with retry (GCR) block acknowledgement (BA) agreement
1302

Identifying by the AP MLD, respective communication links by which the AP MLD is communicatively coupled with the non-AP MLDs
1304

Transmitting by the AP MLD, the data frame on each of the respective communication links
1306

Transmitting by the AP MLD based on the transmission of the data frame, a BA request (BAReq) on respective ones of the communication links to the non-AP MLDs
1308

1402 Identifying, by an access point (AP) in a wireless network, that a groupcast with retry (GCR) BlockAckReq is to be transmitted to one or more non-AP multilink devices (MLDs)

1404 Identifying by the AP in the wireless network, a traffic identifier (TID) related to frames subject to a GCR-BA agreement

1406 Generating, by the AP in the wireless network, a frame that includes the GCR BlockAckReq and a TID_Info portion based on the TID

1408 Generating, by the AP in the wireless network, a frame that includes the GCR BlockAckReq and a TID_Info portion based on the TID

1502 Identifying, by an access point (AP) multilink device (MLD) in a wireless network, a data frame that is to be transmitted to a plurality of non-AP MLDs subject to a groupcast with retry (GCR) block acknowledgement (BA) agreement

1504 Identifying, by the AP MLD, respective communication links by which the AP MLD is communicatively coupled with the non-AP MLDs

1506 Transmitting, by the AP MLD, the data frame on each of the respective communication links

1508 Transmitting, by the AP MLD based on the transmission of the data frame, a BA request (BAReq) on respective ones of the communication links to the non-AP MLDs

FIG. 15

GROUP ADDRESSED FRAME DELIVERY OVER MULTI-LINK SYSTEMS

CLAIM OF PRIORITY

This application claims priority under 35 U.S.C. § 119(e) to U.S. Patent Application Ser. No. 63/122,389, filed on Dec. 7, 2020, the entire contents of which are hereby incorporated by reference.

BACKGROUND

In Wi-Fi systems, group cast frames (BFCs) are transmitted independently over multiple links of a multi-link device (MLD), with each link using its own sequence number (SN) space. As a result, a non-access point (AP) MLD may receive undetectable duplicated group addressed frames (GAFs) when it switches from one link to another. Additionally, other frame types that share the same sequence number space (SNS) type 1 (SNS1) with group cast frames (GCFs) also have duplicate issues over MLD.

SUMMARY

This specification describes processes for group addressed frame delivery over multi-link systems. Embodiments herein relate to a number of designs that may increase the efficiency of MLD and, more particularly, GCR operation in MLD. For example, for transmission over MLD, new SNS design(s) may allow proper duplicate detection of one or both of false negatives and false positives. Additionally, the above-described GTK and PN architecture for MLD may allow unified unicast-BA and group cast BA operation. Additionally, embodiments may relate to a method for GCR-BA operation over MLD. For example, embodiments relate to defining the GCR-BA over MLD procedure where the GCR-BA agreement is established at the MLD level. Additionally, embodiments relate to a GCR BlockAckReq variant, which may allow a TID-specific BA request. Other embodiments may relate to a method for transmitting additional copies of GCFs using MLD_address as the TA. Other embodiments may be described herein.

The processes described herein enable one or more of the following advantages. For 11be_D0.1, group cast frames (GCFs) are transmitted independently over multiple links of MLD, with each link using its own SN space (such as SNS1_link_i). As a result, a non-AP MLD can receive undetectable duplicated GAFs when it switches from one link to another. The processes and systems described herein enable detection of duplicated GAFs. Additionally, other frame types that share the same SNS1 with GCFs also have duplicate issues over MLD. The systems and methods described herein account for GCR operation over MLD. GCR Block Ack is one type of GCR operation. For 11be_D0.1, a unicast block-ack operation is specified over MLD. The systems and methods described herein unify block-ack operation for unicast BA and group cast BA.

The one or more advantages described herein are enabled by one or more of the implementations described herein, such as in the examples section subsequently described.

BRIEF DESCRIPTION OF THE DRAWINGS

FIG. 13 depicts a flow diagram showing an example process for group addressed frame delivery over multi-link systems.

FIG. 14 depicts a flow diagram showing an example process for group addressed frame delivery over multi-link systems.

FIG. 15 depicts a flow diagram showing an example process for group addressed frame delivery over multi-link systems.

DETAILED DESCRIPTION

Figure 1A:
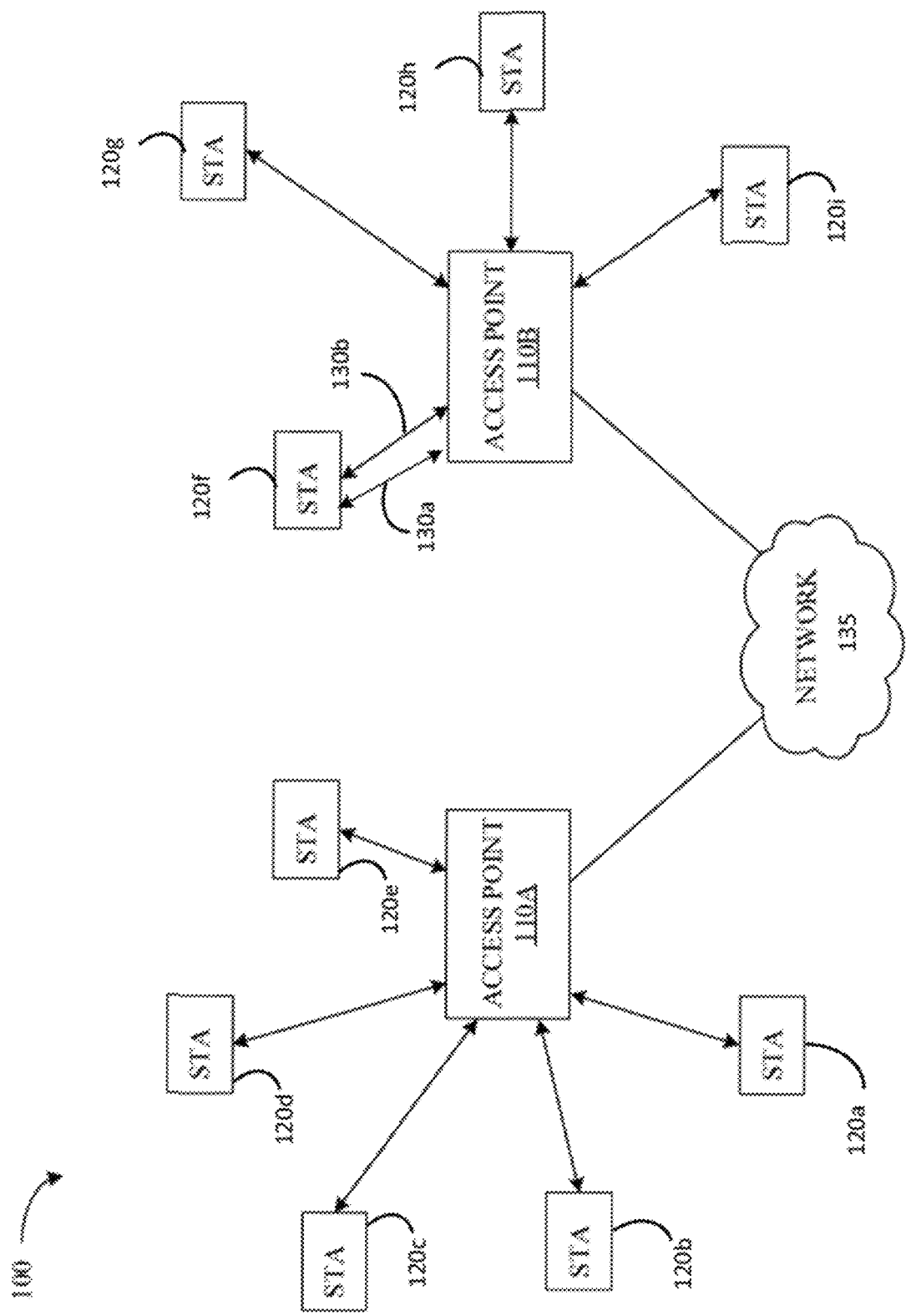
FIG. 1A depicts an example wireless communication network, in accordance with various embodiments.

FIG. 1A illustrates an example of a wireless communication network 100. In this example, the network 100 includes APs 110*a* and 110*b* configured to wirelessly communicate with one or more stations (STAs) 120*a*-120*i* (referred to collectively as "STAs 120"). For example, AP 110*a* is shown in wireless communication with STAs 120*a*-120*e*, and AP 110*b* is shown in wireless communication with STAs 120*f*-120*i*. Each of the APs 110*a* and 110*b* (referred to collectively as "APs 110") are coupled to a network 135, such as the Internet or another interconnected network of computerized devices, thereby providing the STAs 120 with access to the network 135. Note that the wireless communication network 100 can include additional or fewer APs or STAs without departing from the scope of the present disclosure.

In some embodiments, certain of the STAs (e.g., STA 120*f*) may be coupled with an AP (e.g., AP 110*b*) by more than one communication link (e.g., communication links 130*a* and 130*b*). In this case, STA 120*f* may be referred to as a non-AP MLD. Similarly, AP 110*b* may be referred to as an AP MLD. In some embodiments, the communications links may communicate in different frequency bands. For example, communication link 130*a* may provide communication on a 2.4 gigahertz (GHz) frequency band, while communication link 130*b* may provide communication on a 5 GHz frequency band. It will be understood that, in other embodiments, the frequency band may have a range, or may have different values. Similarly, communication between an AP MLD and a non-AP MLD may occur or a larger number of communication links than are shown in FIG. 1A.

Figure 1B:
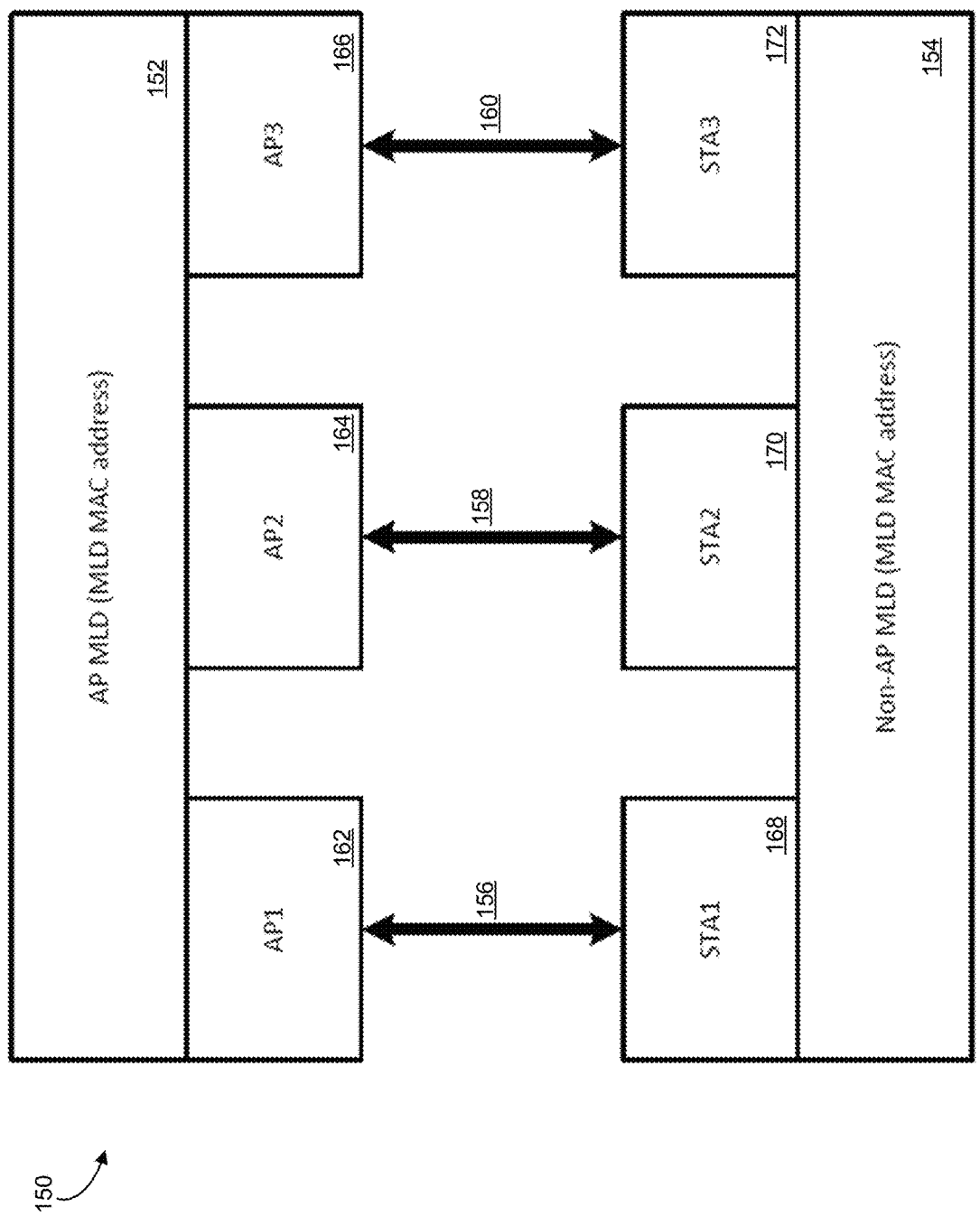
FIG. 1B depicts an example of an AP MLD and a non-AP MLD communicatively coupled with one another by a plurality of links.

FIG. 1B depicts a more detailed example of an AP MLD coupled with a non-AP MLD by a plurality of communication links. Generally, the AP MLD may have its own media access control address. Similarly, the non-AP MLD may have its own MAC address. The APs and STAs may be communicated by a plurality of communication links as depicted in FIG. 1*b*. Further details of the AP MLD and non-AP MLD are described below with respect to FIG. 11.

Figure 2:
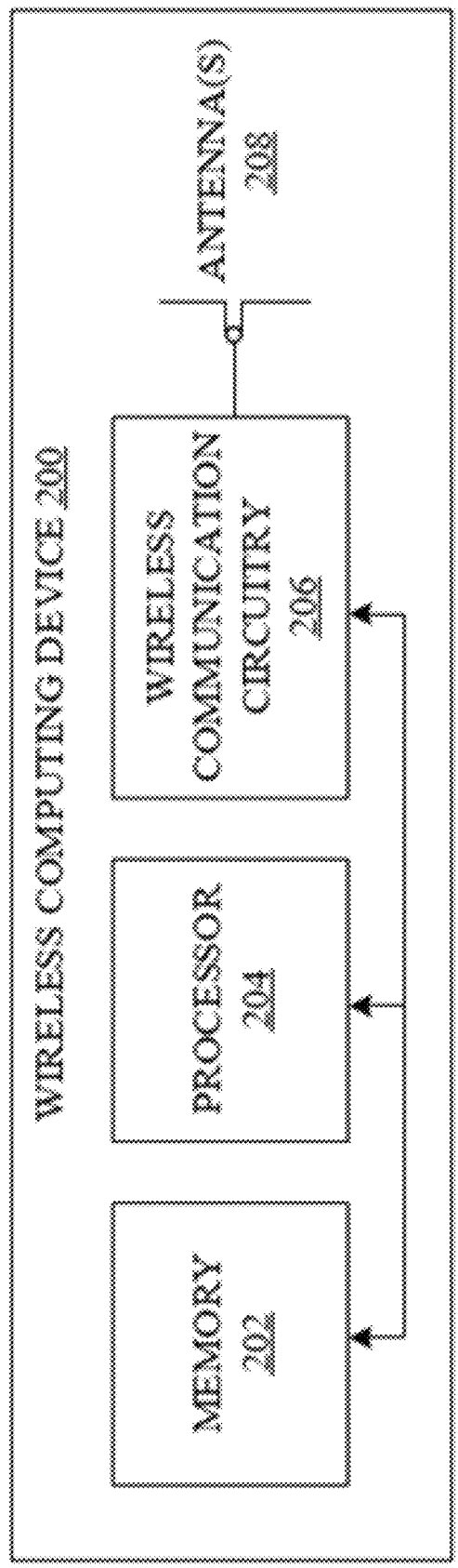
FIG. 2 depicts an example wireless computing device, in accordance with various embodiments.

Returning to FIG. 1A, each of the APs 110 and STAs 120 can be a computing device, such as the wireless computing device 200 of FIG. 2. For example, one or more of the APs 110 or STAs 120, or both, can be, or can be a subsystem of, a substantially portable wireless computing device, such as a smart phone, a hand-held device, a wearable device (e.g., a smart watch), a tablet, a laptop, or a motor vehicle, among other portable wireless devices. As another example, one or more of the APs 110 or STAs 120, or both, can be a substantially stationary computing device, such as a set top box, a router, a media player (e.g., an audio or audiovisual device), a gaming console, a desktop computer, an appliance, or a base station, among other stationary devices.

In an example, each of the APs 110 include baseband processing circuitry and one or more radio transceivers. For example, in a MLD such as AP 110*b*, there may be a separate radio transceiver for each of communication links 130*a* and 130*b* The baseband processing circuitry can be realized by, for example, one or more processors (or processor cores) configured to execute stored program instructions as described herein. In an example, the radio transceiver is configured to: receive baseband downlink signal(s) from the baseband processing circuitry, convert the baseband downlink signal(s) into radio-frequency (RF) downlink signal(s), and transmit the RF downlink signal(s) onto a wireless medium using one or more antennas. The radio transceiver is further configured to: receive RF uplink signal(s) from the wireless medium using the one or more antennas, convert the RF uplink signal(s) to baseband uplink signal(s), and provide the baseband uplink signal(s) to the baseband processing circuitry. The radio transceiver can include one or more transmit chains (e.g., one transmit channel per antenna) and one or more receive chains (e.g., one receive chain per antenna).

Similar to the APs 110, each of the STAs 120 can include baseband processing circuitry and one or more radio transceivers. For example, similarly to AP 110*b*, if a STA is a non-AP MLD such as STA 120*f*, then the STA 120*f* may include a separate radio transceiver for each of communication links 130*a* and 130*b*. The baseband processing circuitry can be realized by one or more processors (or processor cores) configured to execute stored program instructions as described herein. In an example, the radio transceiver is configured to: receive baseband uplink signal(s) from the baseband processing circuitry, convert the baseband uplink signal(s) to RF uplink signal(s), and transmit the RF uplink signal(s) onto a wireless medium using one or more antennas. The radio transceiver is further configured to: receive RF downlink signal(s) from the wireless medium using the one or more antennas, convert the RF downlink signal(s) to baseband downlink signal(s), and provide the baseband downlink signal(s) to the baseband processing circuitry. The radio transceiver can include one or more transmit chains (e.g., one transmit channel per antenna) and one or more receive chains (e.g., one receive chain per antenna).

The APs 110 device and STAs 120 device can communicate using one or more wireless communication techniques. In an example, the APs 110 device and STAs 120 device communicate using wireless local area networking (WLAN) communication technology (e.g., IEEE 802.11/ Wi-Fi based communication) or other techniques based on WLAN wireless communication. In some examples, the APs 110 device and STAs 120 device may further communicate using one or more other wireless communication protocols, such as Bluetooth (BT), Bluetooth Low Energy (BLE), near field communication (NFC), GSM, UMTS (WCDMA, TDSCDMA), LTE, LTE-Advanced (LTE-A), 5G NR, 3GPP2 CDMA2000 (e.g., 1×RTT, 1×EV-DO, HRPD, eHRPD), or combinations of them, among other wireless communication protocols.

In an example, each of the APs 110 are configured to perform downlink spatial multiplexing to one or more of the coupled STAs 120. Downlink spatial multiplexing refers to the ability to transmit two or more spatial streams to a STA 120, where the two or more spatial streams are superposed on the same set of time-frequency resources.

FIG. 2 illustrates an example wireless computing device 200 configured for use in conjunction with various aspects of the present disclosure. In this example, the device 200 includes a memory 202, a processor 204, wireless communication circuitry 206, and one or more antennas 208. The processor 204 is configured to execute instructions and manipulate data to perform operations of the device 200, including operations using algorithms, methods, functions, processes, flows, and procedures as described herein. The processor 204 can be, for example, a central processing unit (CPU), a reduced instruction set computing (RISC) processor, a complex instruction set computing (CISC) processor, a graphics processing unit (GPU), a digital signal processor (DSP) such as a baseband processor, a field-programmable gate array (FPGA), an application-specific integrated circuit (ASIC), a radio-frequency integrated circuit (RFIC), or combinations of them, among other processors. Although illustrated as a single processor 204 in FIG. 2, two or more processors 204 can be used in some implementations.

The processing element 204 can include or be coupled to one or more local and/or system memory elements, such as the memory 202. The memory 202 can include any of a variety of permanent/non-permanent and volatile/non-volatile memory and media devices, and can store instructions and/or data as described herein. For example, memory 202 could be RAM serving as a system memory for processing element 204. Other types of memory and functions are also possible. Although illustrated as a single memory 202 in FIG. 2, two or more memories 202 (of the same or different types) can be used in some implementations of the device 200.

The device 200 also includes wireless communication circuitry 206. In an example, the wireless communication circuitry 206 (sometimes referred to here as a "radio") includes analog and/or digital circuitry components. In general, a radio can include any combination of a baseband processor, analog RF signal processing circuitry (e.g., filters, mixers, oscillators, amplifiers, etc.), and digital processing circuitry (e.g., for digital modulation as well as other digital processing). Similarly, the radio can implement one or more receive and transmit chains using the aforementioned hardware. For example, the wireless device 200 can share one or more parts of a receive chain and/or a transmit chain between one or more wireless communication technologies, such as those discussed above. The wireless communication circuitry can include or be coupled to one or more antennas 208.

Note that the wireless communication circuitry 206 can include a discrete processor or processing element in addition to the processor 204. For example, the processor 204 can be an 'application processor,' while wireless communication circuitry 206 can include its own 'baseband processor.' Alternatively (or in addition), the processor 204 can provide processing capability for the wireless communication circuitry 206. The device 200 can communicate using any of various wireless communication technologies by way of wireless communication circuitry 206 and the antenna(s) 208.

As noted above, in embodiments where the device 200 is, implements, or is implemented by an AP MLD or a non-AP MLD such as those shown in FIG. 1A or 1B, the device 200 may include a plurality of wireless communication circuitry 206. For example, the device 200 may include a first wireless communication circuitry 206 for a first link (e.g., communication link 130*a*) and a second wireless communication circuitry 206 for a second link (e.g., communication link 130*b*).

The device 200 can also include any of a variety of other components (not shown) for implementing device functionality, depending on the intended functionality of the device 200, which can include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 200, such as the memory 202, processor 204, wireless communication circuitry 206, and antenna(s) 208, can be operatively coupled using one or more intra-chip or inter-chip interconnection interfaces. As an example, a USB high-speed inter-chip (HSIC) interface can be provided for inter-chip communications between the processor 204 and the wireless communication circuitry 206. Alternatively (or in addition), a universal asynchronous receiver transmitter (UART) interface, a serial peripheral interface (SPI), inter-integrated circuit (I2C), system management bus (SMBus), and/or any of a variety of other communication interfaces can be used for communications between the memory 202, processor 204, wireless communication circuitry 206, and/or any of various other device components. Other types of interfaces (e.g., peripheral interfaces for communication with peripheral components within or external to device 200, etc.) can also be provided as part of device 200.

The transmitter and receiver use sequence numbers in transmitted frames to identify each transmitted and received frame for duplicate detection. Over the time WLAN has become more complex communication system, multiple sequence number spaces (SNSes) are used for duplicate detection of different frame types, QoS levels as well as receivers and transmitters. One of such sequence number space is SNS1.

SNS1 was the first sequence number space that was introduced to WLAN. In the early days all frames, unicast and group addressed as well as data and management frames were transmitted using the SN (sequence number) from the same SNS1. Also, APs used the same SNS1 for all STAs, i.e., the SNS1 was only transmitter specific and AP did not have receiver specific SN in use. The SN in the transmitted consecutive group or individually addressed frames may be increased by a value larger than 1. Such a broad use of a single SNS1 caused challenges to the SNS1 handling for frame delivery over multiple links.

Over the time, more SN spaces have been introduced. QoS framework added a separate SNS, called SNS2, for unicast frames per receiver and QoS priority level (TID), that is, SNS2 is indexed by <address 1 (i.e., receiver address), TID>. The introduction of multiple SNSs were needed to allow efficient block-ack use, i.e. SN may be increased by one for the consecutively transmitted frame, and the block-ack bit map, and the scoreboard that keeps record of the received frames could use each bit efficiently.

The SN use for the group addressed frame transmission has so far not been evolving similarly as for unicast frames transmission. This has caused duplicate detection problem for the group addressed frame delivery over a new multi-link devices (MLDs). Embodiments herein relate to techniques or structures that resolve one or more of the above-described problems.

FIG. 1B shows architecture 150, where new multi-link devices (MLDs) may communicate over multiple links 156, 158, 160. For instance, one AP MLD 152 may have multiple affiliated APs 162, 164, 166. The legacy STAs 168, 170, 172, as used herein, refer the single-link STAs that are capable to only associate with a single AP and see the AP MLD 152 as a collection of multiple APs 162, 164, 166. A legacy STA 168 can associate with only a single AP 162 and receive all unicast and group addressed frames from this associated AP 162. The non-AP MLD devices 154 can create MLD setup that allows the non-AP MLD devices 154 to receive unicast and group frames from any AP 162, 164, 166 which is part of the ML setup.

As used herein, a non-AP MLD 154 may be a device such as STA 120*f* of FIG. 1A that is coupled with a single AP (e.g., AP 110*b*) by a plurality of communication links (e.g., links 130*c* and 130*e*). In addition, it may be desirable to perform GCR (Groupcast with Retries) operation in a network that includes MLDs. One example of such GCR operation is GCR-BA (Block Ack). Generally, it may be desirable to unify BA operation for unicast-BA and GCR-BA for MLD. Embodiments herein relate to techniques or structures that resolve one or more of the above-described problems.

In legacy networks, an AP and STA may communicate using multicast (transmission of a string of packets from an AP to a group of STAs) or unicast (transmission of a string of packets between a single AP and a single STA). As used herein, a "legacy network" refers to a network that includes only single-link STAs (e.g., STAs that are coupled with an AP by only a single link). By contrast, embodiments herein relate to network that include both single-link STAs and MLDs. The communication performs duplicated detection using SNs, which are assigned to frames of the transmission. Each communication link may be assigned its own SNS. Additionally, each packet in the communication may be assigned a PN. The PNs may be included in an encrypted portion of the packet to prevent a replay attack (e.g., an attack in which a packet may be fraudulently repeated).

Additionally, in legacy networks, a STA may send a single acknowledgment related to a block of a plurality of frames.

This process may be referred to as BA operation. Typically, a STA will only transmit a BA frame in legacy networks when requested by an AP. Such a request may be based on a "BlockAckReq" message transmitted from the AP and received by the STA.

In the legacy networks, the SN use for duplicate detection for the group addressed frames has not been considered relevant, because AP has transmitted each group addressed frame only one time. For group addressed frames and individually addressed frames without block-ack agreement, the SN based duplicate detection has been done only to the frames that have Retry field in MAC Header set to 1, i.e. duplicate detection is done only to the frames that are retransmitted. The legacy acknowledgement scheme assumes that transmitter transmits only a single unicast frame in a SNS, and the transmitter will proceed to the transmission of the frame with a higher SN value only after it has received an acknowledgment (ack) for the previously transmitted frame, or has decided to discard that previously transmitted frame.

In a WLAN network that uses the block-ack scheme for unicast data frames, the receiver agrees to keep a record of receive status for some number of SNs (received, not received), and is capable to send block-ack to signal the status of the received frames and to reorder the frames in the SN order before the frames are forwarded to the application. The SN specific knowledge on whether a frame is already received or not allows the receiver to detect duplicate frames even if the Retry field in the MAC header is not set to 1 for a frame.

In a network containing MLDs, the AP MLD 152 transmits a copy of group addressed data frames from each AP 1262, 164, 166 to allow the legacy STAs associated with each AP to receive these frames and for other considerations (e.g., simple power save management). The non-AP MLD needs to receive these group frames only once, so it may select from which AP it receives the frames. The transmitting AP may use SNS1 for all transmitted legacy unicast data frames (non-QoS data), all management frames and group frames, and the SNS1 used by a particular AP (e.g., AP1 162, AP2 164, AP3 166) is independent from the SNS1 used by other APs of the same AP MLD.

The use of an SNS for each communication link may result in errors in a communication network such as communication network 100 because, although each link may be assigned an SNS, the SNS for each link may not be globally unique. That is, two links may include overlapping SNs. One such error may therefore be referred to as a "false negative" That is, the STA may receive the same frame or the same packet on different links with different SNs. In this situation, the STA may not identify that the packet is a duplicate, because such identification may be based on the SN of the packet.

Another error may be referred to as a "false positive." That is, the STA may receive different frames or packets on different links, but the different frames or packets may include the same SN. In this situation, the STA may falsely identify, based on the SN, that the packets are identical and discard a valid packet.

In addition, a PN may be added to the packets by the encryption key. The PN may be specific to encryption key. Typically, the SN may be used to delete duplicated packets and, if block acknowledgement is in use, the reorder buffer may arrange received packets belonging to the BA agreement into SN order. At the decryption of the received frames, the decrypted frames may have increasing PN. Frames that have smaller or equal PN value than an already decrypted frame may be discarded. This analysis at decryption may ensure that received packets are not a replayed version of a previous frame.

When the transmitter and receiver have not established a BA agreement, then the frames may be transmitted in the increasing SN and PN order. The unicast frames that use acknowledgement may not proceed to the next frame until they get acknowledgement to the previous frame. Proceeding to the next transmitted frame may cause PN update and the loss of the previous frame. This is because, a frame with a smaller PN value, even if it is retransmitted, will be considered a replay attack and deleted upon decryption. Similarly, the group addressed frames always have increasing PN values. In legacy networks, the group addressed frames are transmitted by an AP, which simplifies their PN handling.

Figure 3:
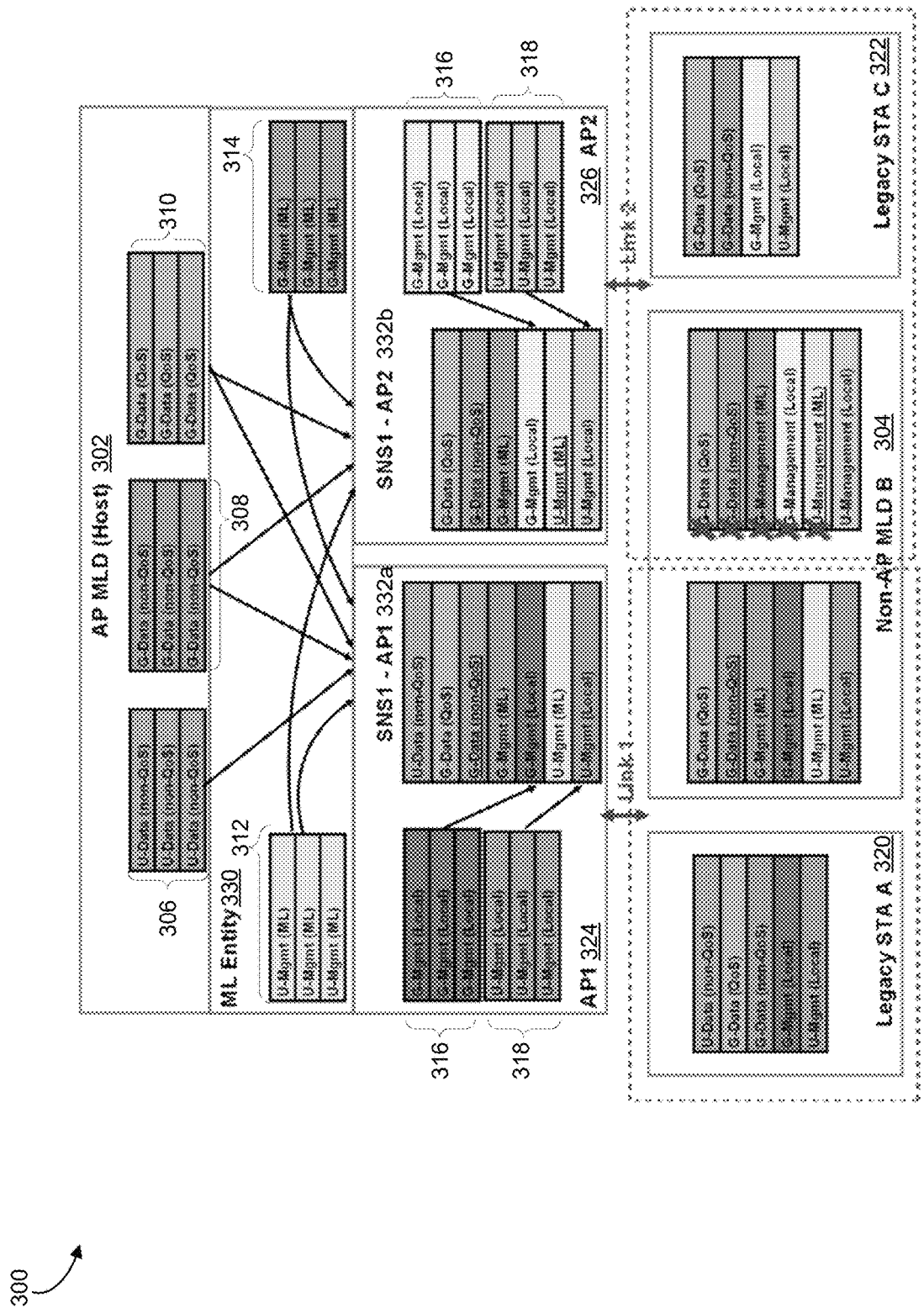
FIG. 3 depicts an example of SNS1 conflicts in a wireless network, in accordance with various embodiments.

FIG. 3 depicts an example of SNS1 conflicts in a wireless network 300 containing MLD, in accordance with various embodiments. Specifically, as may be seen, various data may be provided from an AP MLD 302 (which may be, for example, similar to AP 110*b* of FIG. 1A) to a non-AP MLD 304 (which may be similar to, for example, STA 120*f*). Such data may include, for example:

Non-QoS unicast data frames 306 (referred to herein as U-Data (non-QoS) frames);

Non-QoS Groupcast frames 308 (GCFs) (referred to herein as G-Data (non-QoS) frames); (As described herein, the term "groupcast frames" is used interchangeably with the term "group addressed frames").

QoS GCFs 310 that include GCR frames (Referred to herein as G-Data (QoS) frames);

Unicast management frames 312 that are generated at the multi-link (ML) level, for example by the ML entity 330 of MLD AP (such as access point 110B in FIG. 1A) (referred to herein as U-Mgmt (ML) frames);

Group cast management frames 314 generated at the ML level, for example by the ML entity (referred to herein as G-Mgmt (ML) frames);

Group cast management frames 316 generated at the local level, for example by AP1 or AP2 (referred to herein a G-Mgmt (Local) frames); and Unicast management frames 318, generated at the local level, for example by AP1 or AP2 (Referred to herein as U-Mgmt (Local) frames).

As may be seen in FIG. 3, AP1 324 and AP2 326 may respectively generate the local-level data (e.g., G-Mgmt (Local) and U-Mgmt (Local)). Further, the non-local data such as U-Mgmt (ML), U-Data (non-QoS), G-Data (non-QoS), G-Data (QoS), and G-Mgmt (ML) may be generated at the level above and passed to AP1 324 and AP2 326.

AP1 324 then transmits the data over link 1 to a legacy STA 320 (STA A) and non-AP MLD B. Similarly, AP2 326 transmits the data over link 2 to a legacy STA 322 (STA C) and non-AP MLD B. However, because the same data, or the different types of data using SNS1 332*a*, 332*b*, is transmitted from AP1 324 over link 1 and from AP2 326 over link 2, and the SNS1 332*a*, 332*b* is maintained by a particular AP (e.g., AP1, AP2), the data may create a false positive or a false negative as described above. Specifically, as shown in FIG. 3, the G-Data (QoS) 310, G-Data (non-QoS) 308, G-Mgmt (ML) 314, G-Mgmt (Local) 316, and U-Mgmt (ML) 312 may be received from both AP1 324 and AP2 326 by the non-AP MLD B. Because the same GAF data, or the different types of data using SNS1 332*a*, 332*b* specific to an AP (e.g., AP1, AP2), is received from two sources, one or both of a false positive or false negative may be identified for one or more of the data as described above.

TID-Agnostic GCR-BA

Figure 4:
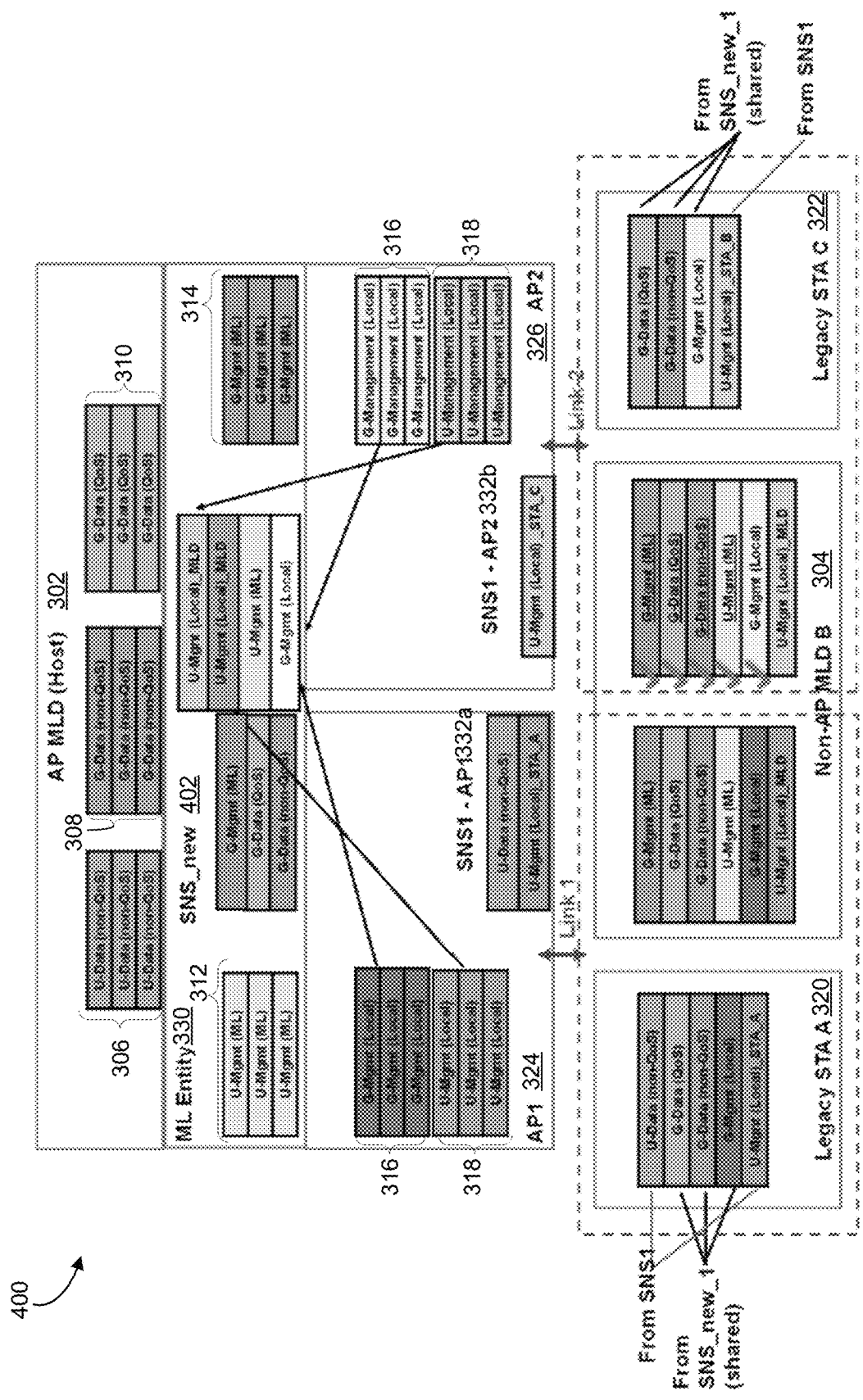
FIG. 4 depicts an example of use of a shared SNS, in accordance with various embodiments.
Figure 5:
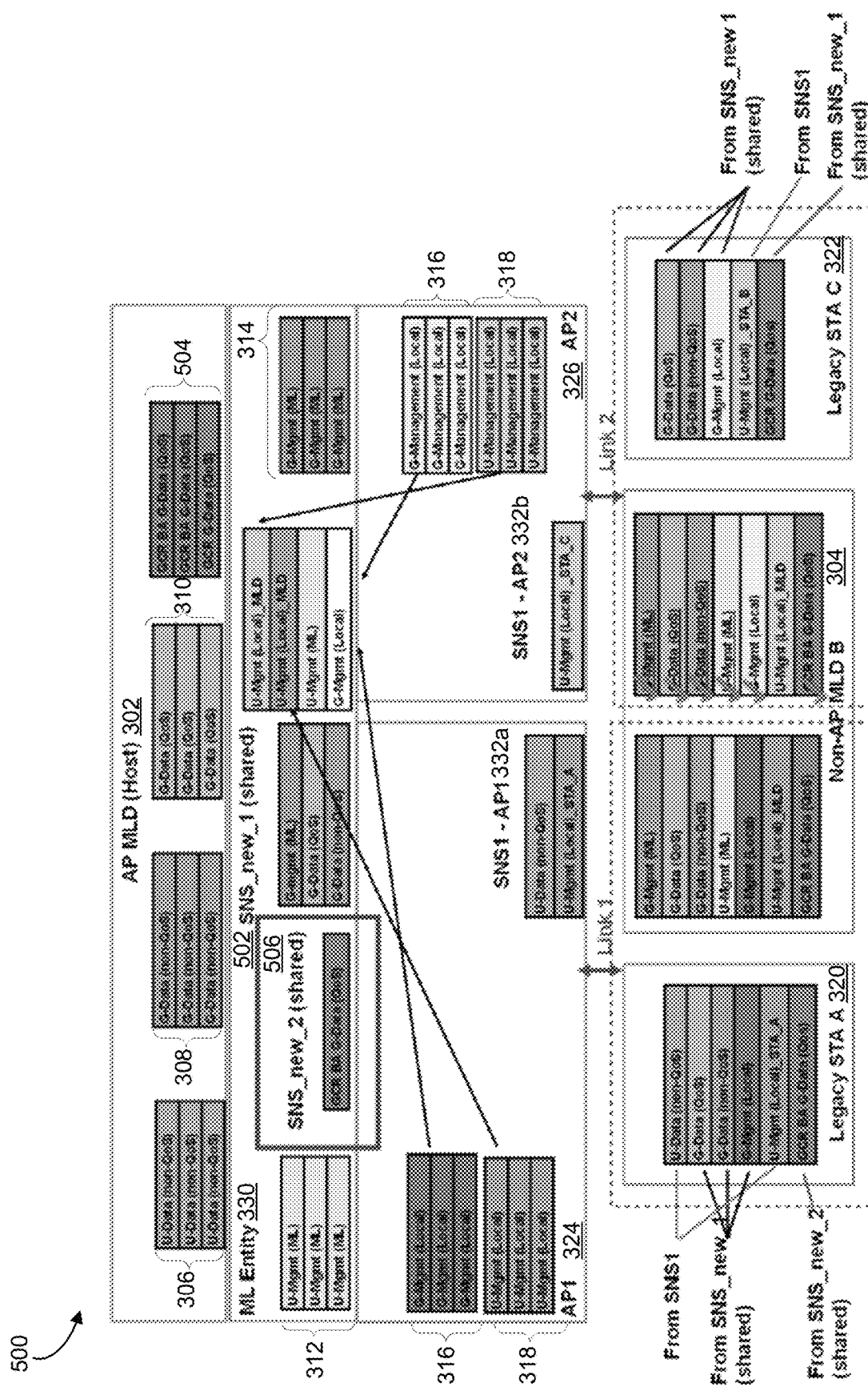
FIG. 5 depicts an alternative example of use of a shared SNS, in accordance with various embodiments.

Generally, FIG. 4 describes a network 400, similar to network 300, in which multiple new sequence number spaces that all operate in ML level. General transmission rules are used for group frames, and the GCR BA operation, if used, is TID-agnostic. FIG. 5 describes a network 500, similar to networks 400 and 300, including a scenario where the GCR BA operation is TID specific. One transmitted frame belongs to exactly one SN space, and 802.11 specification specifies to which SN space the frame belongs.

More specifically, FIG. 4 depicts an example of use of a shared SNS, in accordance with various embodiments, which may resolve one or more of the above-described conflicts. In this embodiment, an SNS 402 (referred to herein as SNS_new) is defined for Link 1 and Link 2. SNS_new 402 has the same SN for the frame with the same data content in both links 1 and 2. The SNS_new 402 may be generated or managed by the ML entity. More specifically, the ML entity may be an element of the AP MLD.

The SNS_new may be used for one or more of the conflicting frames described above. Specifically, as shown in FIG. 4, SNS_new 402 may be used for the transmission of the G-Data (QoS) frames 310 (which may further include GCR frames), G-Data (non-QoS) frames 308, G-Mgmt (ML) frames 314, G-Mgmt (local) frames 316, and U-Mgmt (ML) frames 312. SNS_new 400 may further be used for transmission of U-Mgmt (Local) MLD frames 318, which are U-Mgmt (Local) frames that pertain to the non-AP MLD B 304. As shown in FIG. 4, SNS1 332a, 332b may still be used for the transmission of U-Mgmt (Local) frames and U-data (non-QoS) and from AP1 324 or AP2 326. Alternatively, SNS1 332a, 332b may still be used for the transmission of U-mgmt (Local) frames whose recipient is a legacy single-link STA and the U-data (non-QoS), while the transmission of U-mgmt (Local) frames 318 whose recipient is a non-AP MLD STA use the SNS_new 402.

In this embodiment, the G-Data (QoS) 310 may include both no-Ack/no-retry groupcast (GC) and GCR (Groupcast with Retries) frames. No-Ack/no-retry GC and GCR frames may be frames that are related to transmissions to a legacy STA such as STA A 320 and STA C 322 as well as a MLD STA such as STA B 304. Certain of the STAs 320 (e.g., STA A) may be a legacy STA that is incapable of using the GCR protocol. Another of the STA 322 (e.g., STA C) may be a legacy STA that is capable of using the GCR protocol. In this embodiment, STA A 320 would ignore the GCR frames due to the concealment address employed by the GCR frames, which is a field that prevents group-addressed frames transmitted via GCR from being identified/used by GCR-incapable STAs. STA C 322, by contrast would filter out duplicated GCR frames based on concealment address and destination address (DA), as well as address 2, SN, Retry field value indicated in the frame.

It will be noted that in this embodiment, the GCR BlockAckReq may have a fixed traffic identifier (TID) value. The value may be, for example, a value of "0." Because the TID has a fixed value, this embodiment may be referred to as TID-Agnostic GCR-BA, and may be generally similar in behavior to GCR-BA defined for a single link operation.

Further, the non-AP MLD 304 (e.g., non-AP MLD B) may perform duplicate detection across multiple links (e.g., Link 1 and Link 2). Specifically, because the same frames (e.g., G-Data (QoS) 310, G-Data (non-QoS) 308, etc.) may share the same SNS 402 (e.g., SNS_new) across all links, then the SN of identical frames that are received over Link 1 and Link 2 is identical. The non-AP MLD B 304 uses the SN of a groupcast frame received over link 1 and the SN of a groupcast frame received over link 2 to identify whether the two frames are duplicates. For GCR frames, in addition to use address 2, SN, the retry bit value of the frames, a non-AP STA also uses address 1 (concealment address) for duplicate detection.

In this embodiment, for GCR unsolicited retry, a frame subject to the GCR agreement may also be sent using a legacy no-Ack/no-retry protocol if one or more of the STAs receiving the group address does not have a GCR agreement with the AP to which it is coupled (e.g., AP1 or AP2). As a result, it may be difficult to use different SNSes for GCR unsolicited retry (QoS) and non-GCR G-Data. However, because the GCR-BA policy may be active only when all STAs receiving the group address have a GCR-BA agreement with the AP, it may be possible to use one SNS for GCR-BA related G-Data (QoS) frames (referred to herein as GCR-BA G-Data (QoS) frames) and another SNS for the non-GCR-BA-related G-Data (QoS) frames. Further, it may be possible to allow multiplicity for TID-specific SNS for GCR-BA G-Data (QoS) frames, as described below.

TID-Specific GCR-BA

FIG. 5 depicts an alternative example of use of a SNS that is shared across all links (e.g., link 1, link 2), in accordance with various embodiments. Specifically, FIG. 5 depicts an alternative example of use of a TID-specific SNS for GCR-BA frames 504. As may be seen in FIG. 5, this example may be generally similar to the embodiment of FIG. 4 wherein the SNS_new 502 (referred to in FIG. 5 as SNS_new_1) is shared across all links (e.g., Link 1 and Link 2), and is used for the U-Mgmt (ML) frames, G-Mgmt (ML) frames, G-Data (non-QoS) frames, and G-Mgmt (Local) frames, G-Data (QoS) frames (include legacy no-Ack/no-retry frames and GCR unsolicited retry (QoS) frames), U-mgmt (Local) whose recipient is a non-AP MLD. As shown in FIG. 5, SNS1 332a, 332b may still be used for the transmission of U-data (non-QoS) and U-Mgmt (Local) frames whose recipient is a legacy STA and from AP1 or AP2. Alternatively, SNS1 332a, 332b may still be used for the transmission of U-mgmt (Local) frames whose recipient is either a legacy single-link STA or a non-AP MLD and the U-data (non-QoS).

In this embodiment, the G-Data (QoS) frames, which use the SNS_new_1 502, may not include GCR-BA related frames. Rather, a separate SNS (referred to in FIG. 5 as SNS_new_2 (shared) 506) may be used for GCR-BA G-Data (QoS) frames. Specifically, the SNS_new_2 (shared) 506 may be a SNS that is shared across all links (e.g., Link 1 and Link 2), and is used for transmission of GCR frames subject to a GCR-BA agreement.

As noted, the SNS_new_2 (shared) 506 may be shared across a plurality (or all) of the links, which may allow for multiplicity and is indexed by <address 1, TID>. In other words, there may be multiple TID values, and so there may be multiple SNS_new_2 maintained by the transmitter for each address 1. Accordingly, the GCR BlockAckReq may be modified to be TID-specific.

In some embodiments, the SNS_new_2 506 may be similar to SNS type 2 (SNS2) as defined in the Institute of Electrical and Electronics Engineers (IEEE) 802.11 standard for unicast QoS data. As an alternative, the SNS_new_2 506 may be merged with SNS2. In other words, the SNS2 may be modified such that it is used by both unicast QoS data (referred to herein as U-Data (QoS)) and GCR-BA frames. Doing so may allow for multiplicity, and may be indexed by the "address 1" and TID of the frame.

Other SNS Design Variants

For both the SNS design related to the TID-Agnostic GCR-BA (as described with respect to FIG. 4) and the SNS design related to the TID-specific GCR-BA (as described with respect to FIG. 5), SNS_new or SNS_new_1 may contain a set of SNSes, where each SNS is specific to a receiver address (group or individual address), frame type and/or QoS level, and the transmission of one frame uses the corresponding SNS. For duplication detection, in addition to using SN, a receiver may also use other information, such as frame type, and/or Link ID, etc.

As an example, an additional SNS that is shared across all links and is used only for U-Mgmt. This SNS may be referred to as "SNS_new_x (shared)." The SNS_new_x (shared) may allow for multiplicity, and may be indexed by one or both of an address field (e.g., "address 1 (i.e., receiver address)") and a frame type (e.g., the "frame type" field). In this embodiment, a receiver (e.g., a non-AP MLD such as non-AP MLD B) may use one or more of the frame type field, the "address 2 (i.e., transmitter address)" field, SN as well as other information (e.g., Link ID) for frame duplicate detection.

GCR-BA Over Multiple Links

As noted above, it may be desirable for GCR-BA to be performed over multiple links. Therefore, it may be desirable for a GCR-BA agreement (per concealment address) to be established at the MLD level in a manner similar to that of a unicast-BA agreement. Specifically, the use of a GCR service period (GCR-SP) frame technique may be modified such that, if all members of the GCR-BA group are awake (i.e., not asleep) at a particular time, then an AP MLD (e.g., an AP that has multiple links with a non-AP MLD) may deliver the GCR frames immediately without waiting for a pre-defined deliver traffic indication map (DTIM) beacons. The modified GCR-BA procedure to allow the use of GCR-BA over multiple links may take the form of one (or both) of the two following modes.

Mode 1

Mode 1 may relate to the situation that all members of a GCR-BA group reside on the same link for the GCR operation. In this embodiment, a frame subject to a GCR-BA agreement is sent only on the link between the AP MLD and the non-AP MLD where the recipient STAs reside. The AP MLD may transmit the GCR frames and the BlockAckReq frame, and receive the BA (Block Ack) frame on this operating link. The AP MLD may then determine which, if any, aggregate MAC service data units (A-MSDU) to retransmit based on one or both of a BA bitmap from each member of the group and a missing BA frame. This Mode may generally be seen as involving GCR-BA operation over MLD in a manner similar to that of unicast-BA operation over MLD.

Mode 2

Figure 6:
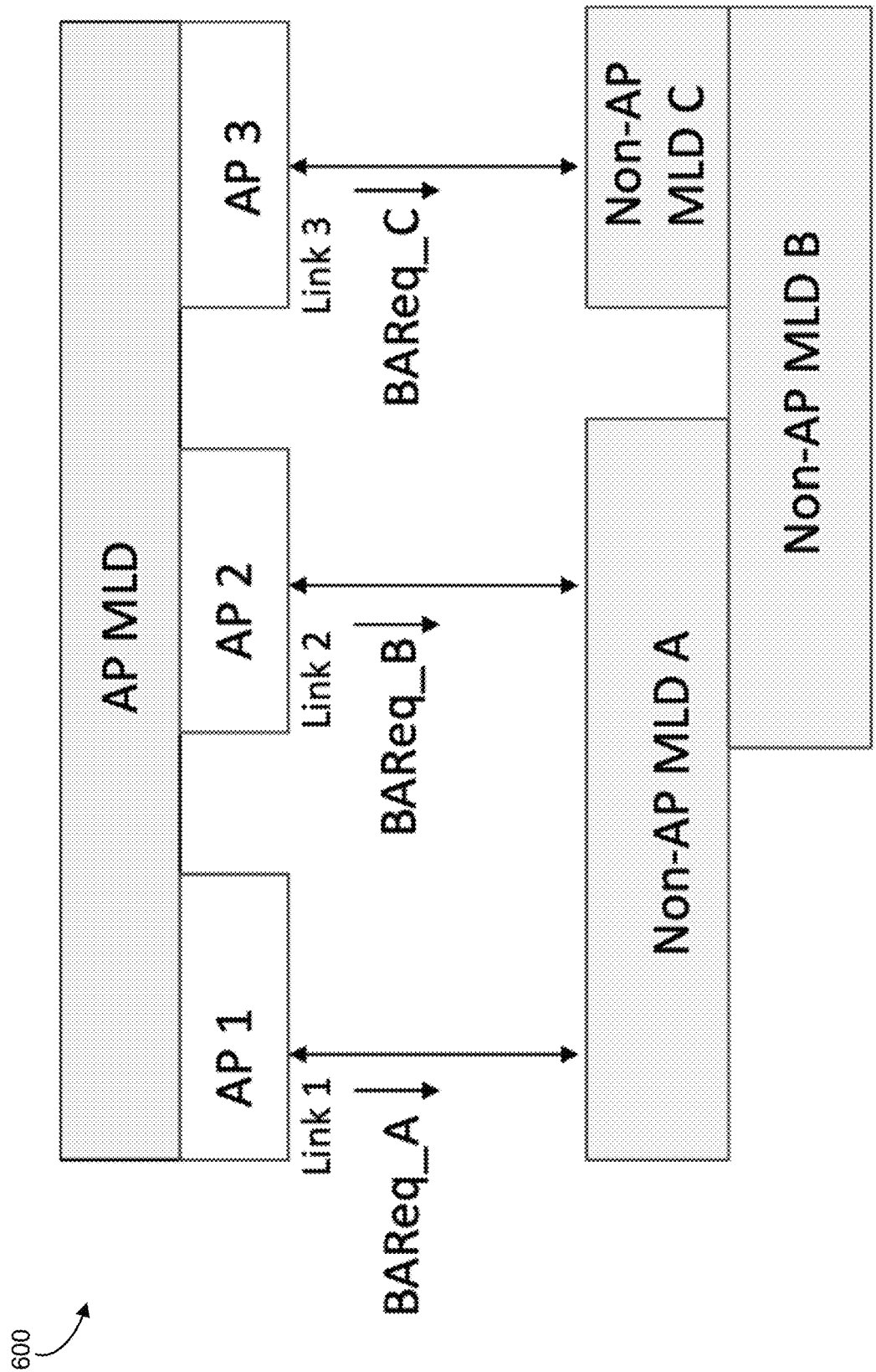
FIG. 6 depicts an example of a procedure related to group cast retries (GCR) block acknowledgment (BA) (collectively, GCR-BA) over multiple links, in accordance with various embodiments.
Figure 7:
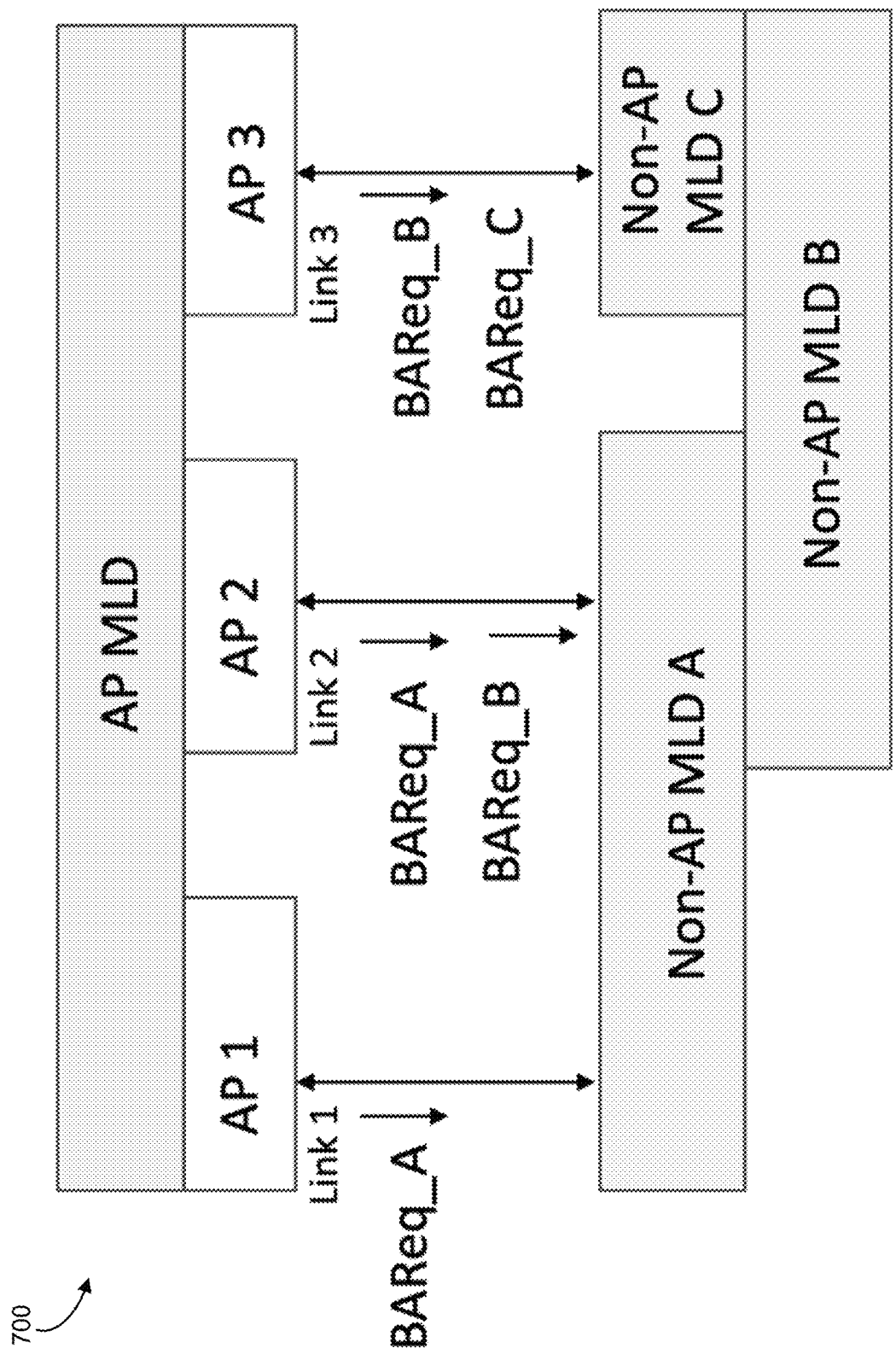
FIG. 7 depicts an alternative example of a procedure related to GCR-BA over multiple links, in accordance with various embodiments.

Mode 2 may relate to a situation in which members of the GCR-BA groups reside on different links for the GCR operation. FIGS. 6 and 7 depict two options for this Mode. Specifically, FIG. 6 depicts an example of a procedure 600 related to GCR-BA over multiple links, in accordance with various embodiments. FIG. 7 depicts an alternative example of a procedure 700 related to GCR-BA over multiple links, in accordance with various embodiments.

In FIGS. 6 and 7, an AP MLD may be coupled with a plurality of non-AP MLDs (e.g., non-AP MLDs A, B, and C) over a plurality of links (e.g., link 1, link 2, and link 3) as described above with respect to, for example, FIG. 1B. Specifically, as shown, AP MLD may communicate with non-AP MLD A over links 1 and 2. AP MLD may further communicate with non-AP MLD B over links 2 and 3. AP MLD may further communicate with non-AP MLD C only over link 3. Please note that the behavior of a legacy STA that associates to one of the APs of the AP MLD and participates in the GCR-BA operation is similar to that of Non-AP MLD C.

In this embodiment, a data frame subject to a GCR-BA agreement may be sent independently (i.e., repeated) on all links of a MLD where the GCR-BA group members reside. Then, the AP MLD may send, to each non-AP MLD in the GCR, a BA Request (BAReq), which may be an explicit request for the non-AP MLD to transmit a BA related to the data frame.

FIG. 6 shows one option by which the BAReq frame may be sent. Specifically, the AP MLD may select a single link on which to send a BAReq to a non-AP MLD. For example, the BAReq related to non-AP MLD A, indicated as BAReq_A, is transmitted on link 1. The BAReq related to non-AP MLD B, indicated as BAReq_B, is transmitted on link 2. The BAReq related to non-AP MLD C, indicated as BAReq_C, is transmitted on link 3.

FIG. 7 depicts an alternative option wherein the AP MLD transmits the BAReq frame related to the non-AP MLD on every link over which the AP MLD and the Non-AP MLD are communicatively coupled. For example, the BAReq_A (i.e., the BAReq sent to non-AP MLD A) is transmitted over links 1 and 2. BAReq_B (i.e., the BAReq sent to non-AP MLD B) is transmitted over links 2 and 3. BAReq_C (i.e., the BAReq sent to non-AP MLD C) is transmitted over link 3.

In either of the embodiments indicated in FIG. 6 or 7, the BA frame may then be transmitted from the non-AP MLD to the AP MLD over the link on which the corresponding BAReq frame is received. Generally, each BAReq frame solicits a BA frame as a response. The BAReq frames transmitted on one link to different non-AP MLDs may have different receive address.

A non-AP MLD (e.g., non-AP MLDs A, B, or C) may filter out duplicate GCR data frames that are received on different links. An AP MLD may derive MLD-level composite bitmaps based on one or more of the bitmaps in the BA frames received on each link from the GCR members and one or more missing BA frame(s). Based on the MLD-level composite bitmap of all members of the GCR-BA group, the AP MLD may decide to transmit or retry an A-MSDU.

In one embodiment, when members of a GCR-BA group reside on different links, they may be able to switch to a common link at the GCR-BA frame delivery time for the GCR operation. In this embodiment, even though the members of the GCR-BA group were initially identified as being on different links (and therefore, Mode 2 may be appropriate), the switch to a single link may therefore make Mode 1 more appropriate.

GCR BlockAckReq Variant for TID-Specific GCR-BA

The legacy IEEE 802.11 standard, describes a variant BlockAckReq for GCR. In that variant, the TID_INFO field may be set equal to 0. However, in embodiments herein where the GCR-BA is TID-specific (as described above with respect to FIG. 5), it may be desirable to unify the multi-link BA operation for both unicast and group cast. In this embodiment, the GCR BlockAckReq may be TID-specific, i.e., the TID_INFO field may not always be set to 0.

This embodiment may be performed in one of two ways. In the first, the existing GCR BlockAckReq variant defined in the legacy standard may be redefined. Alternatively, a new GCR BlockAckReq variant may be introduced that allows for the TID_INFO field to be set to a value other than 0. Such a variant may have a name such as "TID-Specific GCR BlockAckReq variant."

For both of these options, the GCR BlockAckReq variant may be used for a single BlockAckReq or to request BA for multiple TIDs.

GTK and PN

A wireless network may use a GTK to encrypt or decrypt multicast and broadcast traffic between an AP STA and a non-AP STA. A pairwise transient key (PTK) may be used to encrypt or decrypt traffic between a single AP and a single STA. For MLD, a single PTK and a single PN may be used across all links for unicast, while different GTKs may be used for each link for groupcast.

Figure 8:
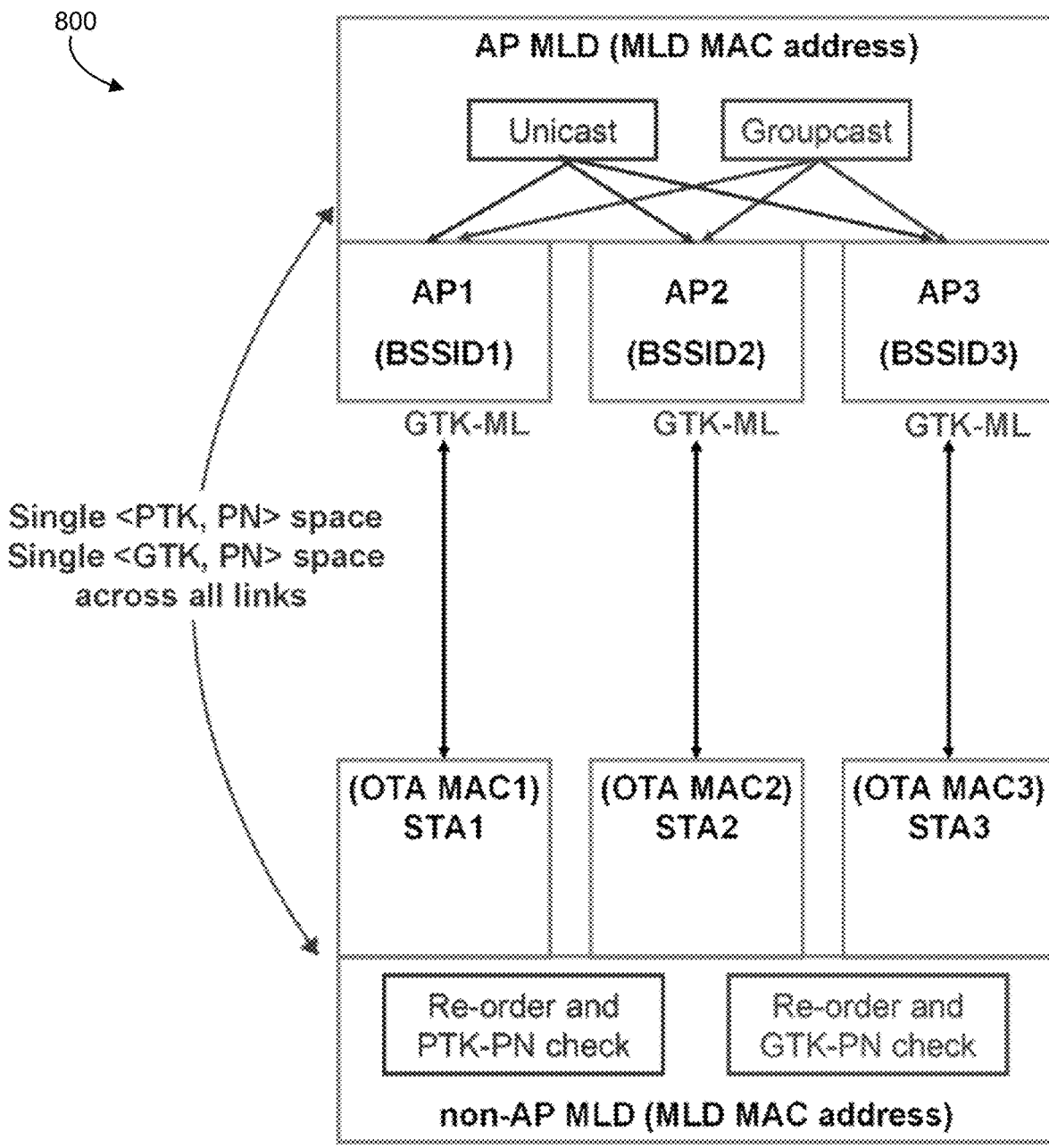
FIG. 8 depicts an example of group temporal key (GTK) and packet number (PN) design for use with multiple links, in accordance with various embodiments.

FIG. 8 depicts an example of GTK and PN check design 800 for use with multiple links, in accordance with various embodiments. In the embodiment of FIG. 8, the BA design may be unified for both (a) unicast-BA operation over MLD and (b) the GCR-BA operation over MLD. Specifically, a single PTK and PN may be used across all links, and a single GTK, which is generated at the ML level and is referred to in FIG. 8 as "GTK-ML" may be used for all links. In this embodiment, the PN check may be performed by the non-AP MLD at the ML level.

Group Frames Reception on Multiple Links

Figure 9:
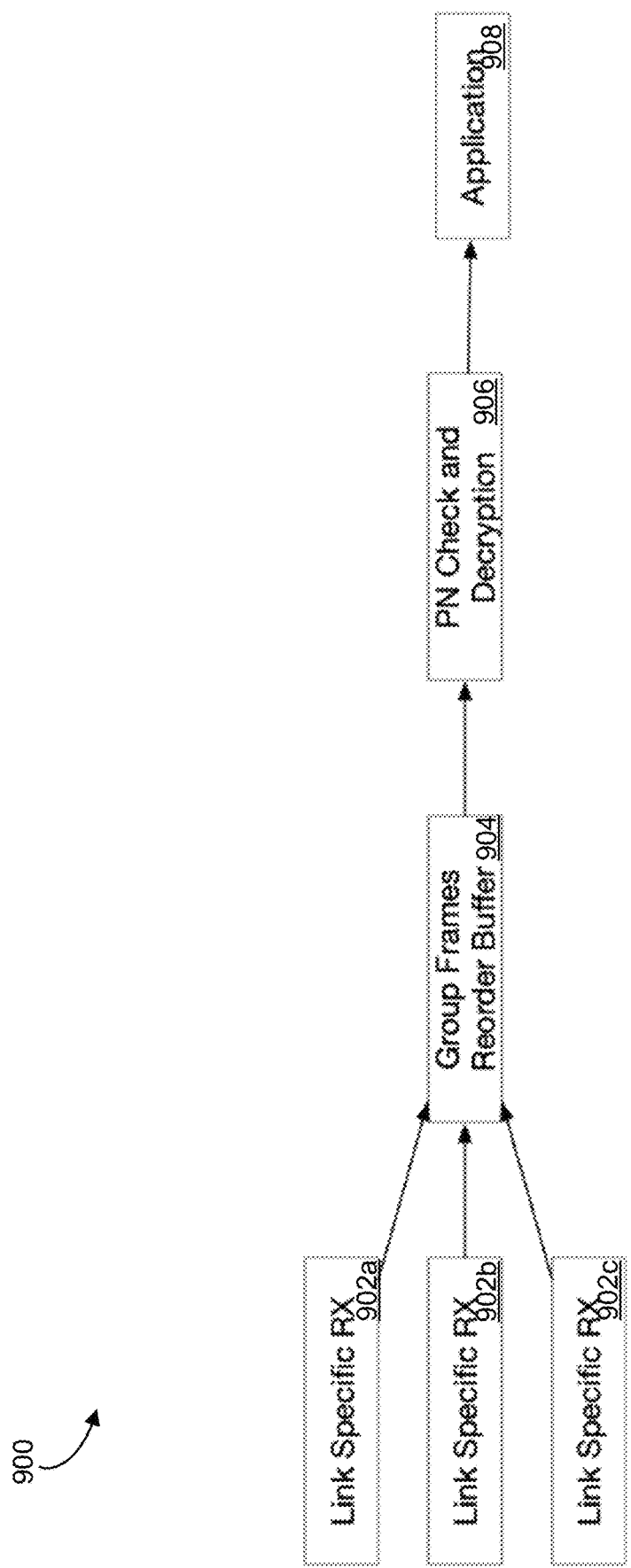
FIG. 9 depicts an example of group frame reception on multiple links, in accordance with various embodiments.

FIG. 9 depicts an example of group frame reception 900 on multiple links, in accordance with various embodiments. As previously discussed, the PN number of the group frames may prevent reception of the group frames that have smaller PN number. In case the group addressed frames have an SN space that is dedicated only for group addressed data frames, then this new SNS can have the SN value for a group addressed frame in all links. The AP may continue to use SNS1 for the unicast management frames generated by the APs (i.e., AP1, AP2) locally (i.e., not generated at the ML level) and unicast non-QoS data frames, or the AP may introduce receiver-specific SNSs to transmit these frames.

A separate copy of each group addressed data frame or group addressed management frame may be transmitted on each link, which allows a non-AP MLD to receive group frames only from a single link, in order to simply the power save operation of the non-AP MLD. The non-AP MLD may select the link from which it receives the group addressed frames and the non-AP MLD does not need to determine whether different links have different buffered group frames.

Transmitting a copy of a group frame in all links is not a fully accurate definition in all cases. Some group management frames and group data frames may be link specific. For instance, an AP may broadcast BSS Transition Management (BTM) request frame that requests all STAs that are associated to the AP to move to another AP, or alternatively, an AP may broadcast an Extended Channel Switch Announcement Frame that signals that AP will switch to operate in a different channel. If these management frames are transmitted by other APs affiliated with the AP MLD, then the information is relevant only to non-AP MLDs that have setup multi-link with the AP MLD but irrelevant to the legacy STAs associated to the AP of an AP MLD.

In addition, link specific group addressed data frames may be needed by service discovery protocols. For example, universal Plug and Play (UPnP) or Bonjour are used to allow local devices to offer services by transmitting group addressed data frames that carry service discovery information of the available services. Sometimes, a service may be available only through a specific AP. For instance, an application may use high transmission capacity that is supported by the 5 or 6 GHz bands but not supported by the 2.4 GHz band. In these cases, the service discovery information may be available for legacy STAs through APs operating in 5 GHz and 6 GHz bands and for non-AP MLDs over all links, but irrelevant to the legacy STAs associated to the APs operating on the 2.4 GHz band, and therefore should not be received by the legacy STAs operating on the 2.4 GHz band. Please note, there are other examples.

The AP MLD needs to have means to transmit these group addressed management frames and group addressed data frames so that legacy STAs can receive the frames only from a single AP or from subset of APs, but non-AP MLDs can receive the group addressed frame in all links. There are multiple ways to make the DL (downlink) group addressed frame receivable only by the non-AP MLDs. For instance, AP may transmit the group addressed frame in a physical layer protocol data unit (PPDU) format that is receivable only by the non-AP MLDs.

In other embodiment, the AP may add a new frame type to piggy back the old DL group frame. This new frame type is understood only by the non-AP MLDs and the legacy STAs are not able to understand the frame content.

The new PPDU type and new frame may contain information that identifies the AP(s) in AP MLD that is group casting the legacy receivable frame or it may identify the AP(s) that transmit the frames that are only receivable by the MLDs but not the legacy STAs.

In an embodiment, the AP may transmit link specific individually addressed management frames to a non-AP MLD. To reduce implementation options, the AP may carry the management frame in the new type of management frame that is receivable only to non AP MLDs. The new management frame signals also the AP in AP MLD and/or the STA in non-AP MLD that operate in a link to which the link specific management frame carries signaling information. For instance, AP2 in AP MLD may unicast to the STA2 in non-AP MLD the new management frame type carrying management information for the link in which the AP1 in AP MDL and STA1 in non-AP MLD operate. Please note that unicasted management frames are received by a single addressed STA. The use of the same new MPDU type reduces need to have a separate solution to unicast information on another link.

In one embodiment, the AP MLD may unicast a copy of all or selected group addressed frames to a non-AP MLD. If such link specific group addressed management or data frame is unicasted, the AP applies the same new frame type, if the information is targeted for another AP in AP MLD.

The non-AP MLD may transmit an UL (uplink) unicast frame that requests AP MLD to DL group cast the UL frame to associated STAs in AP MLD. Currently, AP broadcasts the UL frame in all APs of the AP MLD.

The non-AP MLD may have new signaling in the UL unicast frame that signals to AP the set of APs in which the frame should be group casted in legacy receivable format. For instance, the UL unicast frame may include a control field that signals the links to which the frame will be group transmitted in a format that is receivable for legacy STAs. In one embodiment, the control field may be the A-Control field in the MAC Header. The AP will group cast the group frame in other links so that it is receivable only to non-AP MLDs.

The AP may parse the UL unicast frames that contain a frame that will be DL group casted by the AP. If the AP detects that UL unicast frame contains service discovery information, the AP may automatically group cast the frame in legacy STA receivable format only in the AP in which the frame was received and group cast the frame in non-AP MLD receivable format in other links. In some embodiments, the AP may have a logic to decide the transmission resource needs of the applications that are advertised in the service discovery information and group cast the service discovery information in the legacy receivable format in APs that have enough capacity to be able to operate the advertised application and other ongoing traffic in acceptable QoS level.

In FIG. 9, a non-AP MLD may receive frames on a plurality of links (each indicated by "link Specific receiving (RX) 902a-c"). The group data frames may be provided to a Group Frame Reorder buffer 904, which may perform duplicate frame detection and missing frames detection by checking SN of the received frames. The Group Frame Reorder buffer 904 may further eliminate duplicated frames. In some embodiments, if the non-AP MLD receives group frames from a single AP over a single link it may not need, or may not use, a Group Frame Reorder buffer.

The Group Frame Reorder buffer 904 may not need any setup signaling, its size and use of such buffer may be receiver specific operations. In other embodiments, the non-AP MLD may signal the size of its Group Frame Reorder buffer 904 and the number of SNSs to which it may have Group Frame Reorder buffers. The number of Group Frame Reorder buffers may help AP MLD to decide the number of QoS levels it uses to transmit group frames.

After processing the duplicates, the Group Frame Reorder buffer may provide the frames to the PN Check and Decryption block 906 based on one or more conditions. In some embodiments, if all links use the same GTK, the PN check and decryption may be done only after reordering, otherwise possible higher PN from other link may prevent frames decryption. In some embodiments, the reordering should be done regardless whether the group data frames are encrypted with a same GTK in all links or with link specific GTKs.

Individually addressed frames may be selectively retransmitted. In this operation, a BA typically identifies the SN of the MAC protocol data unit (MPDU) which is received. All other SNs are either not received or not transmitted. Such selective retransmission may not be available for group frames that are transmitted one time over each link. The receiver may keep link specific SN counter for the received data frames. If a link specific SN is higher than missing frame in a link, then the receiver knows that it will not receive the missing from this link.

In one embodiment, the receiver checks the link specific SN value only after DTIM beacon when it has received the group addressed frames. In some AP implementations, the group frames transmission may not be performed exactly in the SN order, but the set of frames transmitted after the DTIM beacon should be within the SN range.

In one embodiment, the STAs associated to the AP are all in active mode and AP may send group addressed frames as soon as possible, without waiting for the DTIM beacons. In this case, a STA may apply some delay after which it considers the SN of the received group addressed frame as the link specific SN value.

As discussed earlier, group addressed data frames may be transmitted with the QoS priority levels defined by the User Priority field in the MAC Header. The QoS data frames may belong to multiple SNSs and the receiver may maintain multiple link specific values, one per SNS.

Figure 10:
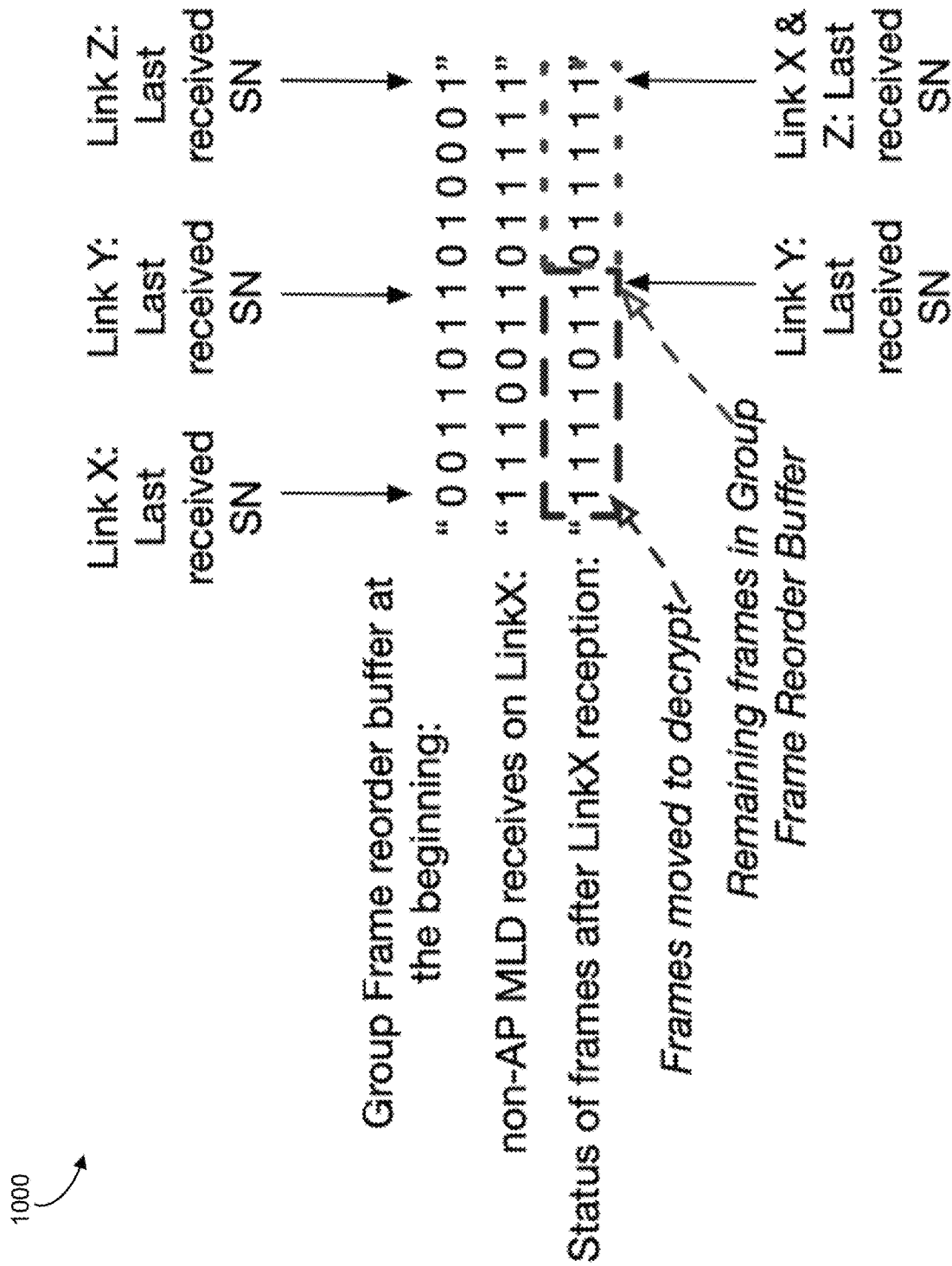
FIG. 10 depicts an example of frame processing by a Group Frames Reorder buffer, in accordance with various embodiments.

FIG. 10 depicts an example of this condition. Specifically, FIG. 10 depicts an example of frame processing by a Group Frames Reorder buffer, in accordance with various embodiments. FIG. 10 shows group frames reception status in three links X, Y and Z. The Upper line shows an example situation, where the receiver has received different group frames from different links. The highest SN of the received group frames have different values. The FIG. 10 shows an example operation where the receiver receives group frames form link X. The bitmap indicates status of the received group frames. Value 1 in the bitmap signals that a frame with the matching sequence number is received by the STA and value 0 indicates that STA has not received the frame with the matching sequence number. If all links have passed a SN of a frame that is not received, then the receiver may identify that this group frame will not be transmitted any more through any link and the STA needs to consider this group frame as lost. For instance, in the scenario 1000 of FIG. 10, the first two group frames with the lowest SN, i.e. the leftmost values 0, are received in link X, the frames with fourth and fifth lowest SN are not received, and the frame with sixth lowest SN is received. Thus, the reorder buffer is missing the frame with fifth lowest SN, but because this frame cannot be received from any link, the reorder buffer may leave a hole on received group frames and forward the received packets to the PN check and decryption.

As another condition, the receiver may decide that it prefers to reduce its power consumption and only receive group frames from other links, if the group frames leave large holes to SN. For instance, STA may accept loss of one or two group frames per DTIM period.

Another condition may be related to a received frame that does not fit to the reorder buffer. In this situation, the frames with the lowest SN may be forwarded to the PN Check and Decryption to make space for newly received frames.

After processing, the PN Check and Decryption block 906 may output the frames to an application 908 for further processing. It will be understood that the embodiment depicted in FIG. 9 is intended as a highly simplified example embodiment. One or both of the Group Frames Reorder buffer and the PN Check and Decryption block 906 may be implemented as hardware, software, firmware, or some combination thereof.

For a non-AP MLD, it is difficult to change the AP from which the group addressed frames are received, if the SNs of multiple APs of an AP MLD are not coordinated. The only safe time to change the AP from which the STA receives group frames is when the current and new AP have no buffered traffic. Deciding such period may be complicated and if non-AP MLD operates multiple radios, it may not be able to wait for suitable time.

The same SN use for all group frames without GCR or other delivery enhancements also simplifies group frames reception in non-AP MLD. The STA can switch the AP from which it receives group frames without risk of duplicate frames being forwarded to the application 908.

If a non-AP MLD is saving power, it is likely that group addressed frames are received from a single AP. If the STA is changing the AP from which it receives the group addressed frames, it is recommended to temporarily receive group addressed frames from two APs. This ensures that STA receives all group addressed frames. If the STA detects the SN of the received group frame from new AP to be smaller than SN received from the current AP, then the STA may transition immediately. If the SN of the group frame is larger than received from the current AP, then the STA should continue to receive group addressed frames from the current AP to receive all group addressed frames.

If the old AP transmits group frames after DTIM beacon, good candidate switch time to receive group frames from new AP is right after all group frames are transmitted. In many implementations, the AP transmits group frames continuously. The non-AP MLD may detect that AP transmitted all group addressed frames, if the STA detects unicast frame transmission from the AP, or the STA detects idle period (no transmission from the AP) in the channel.

GCF Transmitted Using MLD_address

Figure 11:
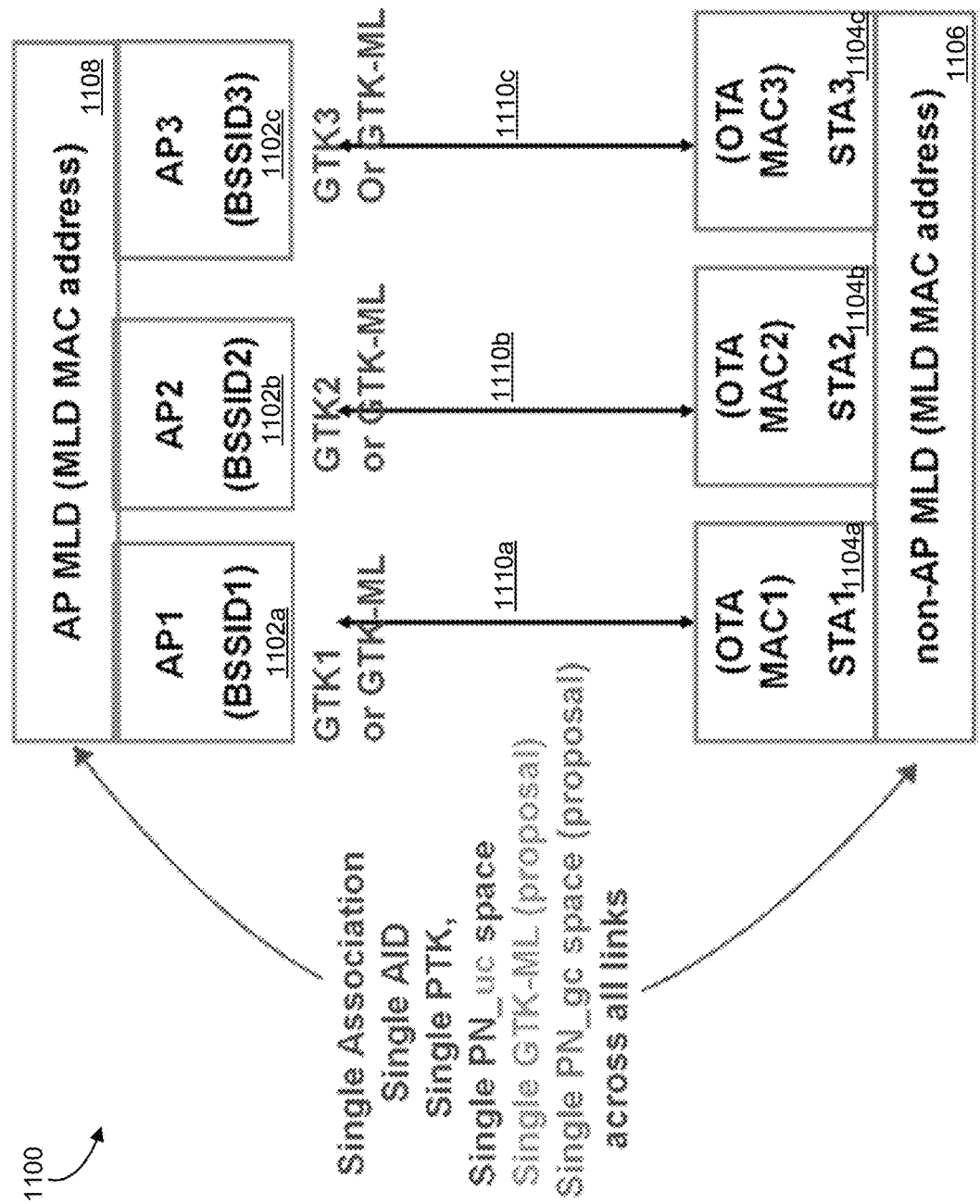
FIG. 11 depicts an example of an additional copy GCF transmitted based on MLD medium access control (MAC) addresses (MLD_addresses), in accordance with various embodiments.

In some embodiments, it may be desirable to transmit an additional copy of the GCF using an MLD_address of the AP MLD as the transmit address, in addition to the GCFs transmitted using the MAC address of a specific AP (e.g., AP1, AP2) as the transmit address. FIG. 11 depicts an example of this embodiment 1100. Specifically, FIG. 11 depicts an example of usage of GTK and PN space for two copies of GCF transmitted using MLD_addresses and AP_i's MAC address, respectively, in accordance with various embodiments. By receiving only the copy of GCFs with the specific transmit address (e.g., legacy STAs only receive the copy with the MAC address of a specific AP as the transmit address) and filtering out/discarding the copy with other transmit address (e.g., legacy STAs filter out/discard the copy with the AP MLD address as the transmit address), such methods will eliminate the duplicate detection errors (both "false positive" and "false negative" cases as described earlier) for both legacy STAs and non-AP MLDs. The details of such methods are described below.

As may be seen in FIG. 11, and as briefly described previously with respect to FIG. 1B, an AP MLD 1108 may be communicatively coupled with a non-AP MLD 1106 by a plurality of links 1110a-c. Additionally, a number of APs 1102a-c (AP1, AP2, and AP3) may be coupled with a number of STAs (e.g., STA1, STA2, and STA3). The AP MLD may have an MLD_address, and the non-AP may have an MLD_address. The respective APs may have respective basic service set identifier (BSSIDs), which may be the MAC addresses of the APs. Similarly, the respective STAs may have over-the-air (OTA) mac addresses (OTA MAC1, OTA MAC2, OTA MAC2), which are the MAC addresses of the STAs 1104a-c.

In this embodiment, the respective APs 1102a-c and STAs 1104a-c may communicate over their respective links using a GTK (e.g., GTK1, GTK2, GTK3 or GTK-ML (i.e., GTK generated at the MLD level)). Meanwhile, the AP MLD and the Non-AP MLD may communicate across all links using a single GTK-ML and using a single groupcast PN (PN_gc) space. In addition to transmit the GCFs on each link using the corresponding address of AP_i ("i" is the link index) as the transmit address (i.e., address 2 of the frames), GCFs are also transmitted over all links using the MLD_address as the transmit address (i.e., address 2 of the frames).

The following example behaviors depicted in Table 1 may be exhibited on the transmit side. The behaviors may be relevant to, for example, the embodiment of FIG. 4 wherein the system uses SNS_new 402. As used in Table 1 (and other tables in this section), transmit address (TA) may refer to the transmit address in the GCF.

TABLE 1

Transmission of additional copy of GCF using MLD_address

| | Link(s) transmitted | Encryption Key | Use SNS_new (as defined, for example, with respect to FIG. 4) |
|---|---|---|---|
| GCF with TA = MLD_address | Transmit all links | GTK-ML | Yes. A single SNS is shared across all links for the GCF |

TABLE 1-continued

Transmission of additional copy of GCF using MLD_address

| | Link(s) transmitted | Encryption Key | Use SNS_new (as defined, for example, with respect to FIG. 4) |
|---|---|---|---|
| GCF with TA = AP_i_address | Link_i | GTK_i or GTK-ML | Transmission on link_i uses its own SNS1_i as defined in the IEEE 802.11-20016 specification. This preserves legacy behavior. |

Similarly, the following example behaviors depicted in Table 2 may be exhibited on the receive side.

TABLE 2

Reception of additional copy of GCF using MLD_address

| | Action taken by Legacy STA | Action taken by non-AP MLD (e.g., MLD_STA) |
|---|---|---|
| GCF with TA = MLD_address | Filter out/discard the GCF (based on the TA or the SA (source address)) | Receive the GCF |
| GCF with TA = AP_i_address | Receive the GCF | Filter out/discard the GCF (based on TA) |

In some embodiments, for example, the embodiment depicted with respect to FIG. 5, it may be desirable to additionally create an SNS that is specifically related to BA for GCA. This SNS may be referred to herein as SNS_G-CA_BA (shared). This SNS may be shared across all links, and may be used to transmit GCFs that are subject to a GCR_BA agreement. Use of the SNS_GCA_BA (shared) may allow for multiplicity, and may be indexed by the "address 1" field of the frame and/or the TID. In another embodiment, the SNS_GCA_BA (shared) may be merged with SNS2 as described above with respect to the embodiment of FIG. 5. In this embodiment, the following example behaviors depicted in Table 3 may be exhibited on the transmit side, and the example behaviors depicted in Table 2 may be exhibited on the receive side.

TABLE 3

Transmission of additional copy of GCF using MLD_address

| | Link(s) transmitted | Encryption Key | SNS_new used? | SNS_GCA_BA |
|---|---|---|---|---|
| GCF with TA or SA = MLD_address | All links | GTK-ML | Yes. A single SNS shared across all links for the GAF, except GCA_BA frames | Yes. An SNS is shared across all links for the transmission of frames subject to GCA BA agreements. |

TABLE 3-continued

Transmission of additional copy of GCF using MLD_address

| | Link(s) transmitted | Encryption Key | SNS_new used? | SNS_GCA_BA |
|---|---|---|---|---|
| GCF with TA or SA = AP_i_address | Link_i | GTK_i or GTK-ML | Transmission on link_i uses its own SNS1_i space, as defined in the IEEE 802.11-2016 specification. In this way, legacy behavior may be preserved | Transmission on link_i uses its own SNS1_i space, as defined in the IEEE 802.11-2016 specification. In this way, legacy behavior may be preserved |

Figure 12:
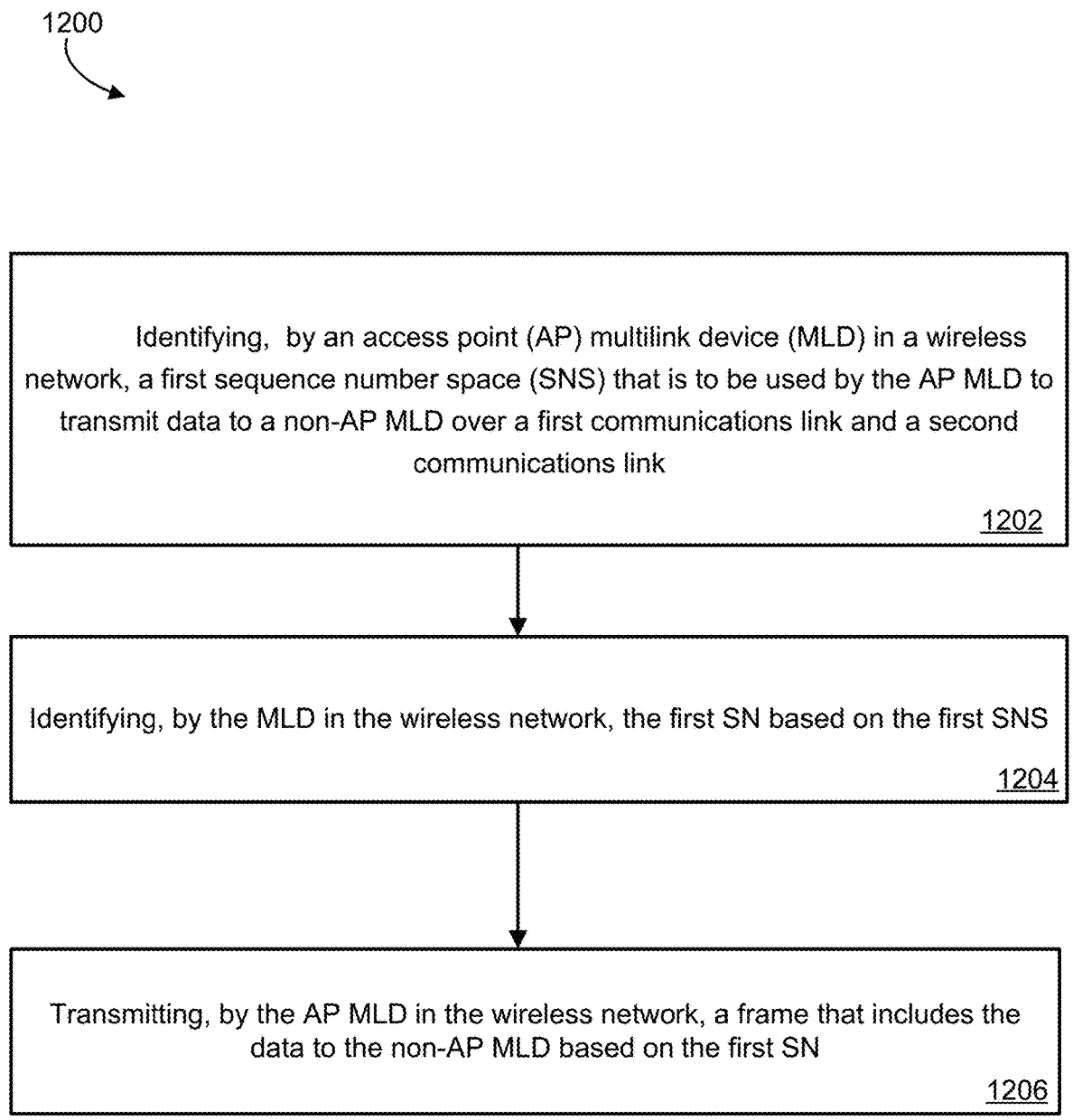
FIG. 12 depicts a flow diagram showing an example process for group addressed frame delivery over multi-link systems.

FIG. 12 depicts a flow diagram showing an example process 1200 for group addressed frame delivery over multi-link systems. The process 1200 includes identifying (1202), by an access point (AP) multilink device (MLD) in a wireless network, a first sequence number space (SNS) that is to be used by the AP MLD to transmit data to a non-AP MLD over a first communications link and a second communications link. Frames with identical data that are transmitted over the first and second communications links will have an identical first SN based on the first SNS. In some implementations, the first frame is a frame related to groupcast data (G-Data) for quality of service (QoS), groupcast with retry (GCR) data, G-Data not requiring QoS, groupcast management data generated at the multilink (ML) level, Groupcast management data generated by the first AP, unicast management data generated at the ML level, and possibly unicast management data generated by the AP and is intended for the non-AP MLD.

The process 1200 includes identifying (1204), by the MLD in the wireless network, the first SN based on the first SNS. In some implementations, the SNS is independent of a traffic identifier value (TID) of the first frame for GCR-BA operation.

The process 1200 includes transmitting (1206), by the AP MLD in the wireless network, a frame that includes the data to the non-AP MLD based on the first SN.

In some implementations, the process 1200 includes identifying, by the MLD in the wireless network, a second SNS that is to be used by the MLD to transmit groupcast with retry block acknowledgment (GCR-BA) data over the first communications link and the second communications link, wherein identical frames on the first and second communications links that include identical GCR-BA data will have an identical second SN based on the second SNS. In some implementations, the process 1200 includes identifying, by the MLD in the wireless network, the second SN based on the second SNS. In some implementations, the process 1200 includes transmitting, by the AP MLD in the wireless network, a frame that includes the GCR-BA data to the non-AP MLD based on the second SN.

In some implementations, the identification of the second SNS is based on a value of "address 1" of the frame that includes the GCR data. In some implementations, the second SNS is indexed by a traffic identifier (TID) value of the frame that includes the GCR data.

In some implementations, the process 1200 includes identifying, by the MLD in the wireless network, a third SNS that is to be used by the MLD to transmit unicast management data over the first and second communications links, wherein identical frames on the first and second communications links that include identical unicast management data will have an identical third SN based on the third SNS, where the identification of the third SNS is based on a value of "address 1" and frame type of the frame. The process 1200 can include identifying, by the MLD in the wireless network, the third SN based on the third SNS. The process 1200 can include transmitting, by the AP MLD in the wireless network, a frame that includes the unicast management data to the non-AP MLD based on the third SN.

FIG. 13 depicts a flow diagram showing an example process 1300 for group addressed frame delivery over multi-link systems. The process 1300 includes identifying (1302), by an access point (AP) multilink device (MLD) in a wireless network, a data frame that is to be transmitted to a plurality of non-AP MLDs subject to a groupcast with retry (GCR) block acknowledgement (BA) agreement. The process 1300 includes identifying (1304), by the AP MLD, respective communication links by which the AP MLD is communicatively coupled with the non-AP MLDs. The process 1300 includes transmitting (1306), by the AP MLD, the data frame on each of the respective communication links. The process 1300 includes transmitting (1308), by the AP MLD based on the transmission of the data frame, a BA request (BAReq) on respective ones of the communication links to the non-AP MLDs.

In some implementations, a different BAReq is transmitted for each of the non-AP MLDs, and wherein a BAReq for each of the non-AP MLDs is only transmitted on a single communication link. In some implementations, a different BAReq is transmitted for each of the non-AP MLDs, and wherein a BAReq for each of the non-AP MLDs is transmitted on a plurality of the communication links. In some implementations, the process 1300 includes receiving, from a non-AP MLD, a BA on a link on which a corresponding BAReq was transmitted to the non-AP MLD.

FIG. 14 depicts a flow diagram showing an example process 1400 for group addressed frame delivery over multi-link systems. The process 1400 includes identifying (1402), by an access point (AP) in a wireless network, that a groupcast with retry (GCR) BlockAckReq is to be transmitted to one or more non-AP multilink devices (MLDs). The process 1400 includes identifying (1404), by the AP in the wireless network, a traffic identifier (TID) related to frames subject to a GCR-BA agreement. The process 1400 includes generating (1406), by the AP in the wireless network, a frame that includes the GCR BlockAckReq and a TID_Info portion based on the TID. The process 1400 includes transmitting (1408), by the AP in the wireless network, the generated frame. In some implementations, the generated frame is to request TID-specific block acknowledgement (BA) from the non-AP MLDs.

FIG. 15 depicts a flow diagram showing an example process 1500 for group addressed frame delivery over multi-link systems. The process 1500 includes identifying (1502), by an access point (AP) multilink device (MLD) in a wireless network, a data frame that is to be transmitted to a plurality of non-AP MLDs subject to a groupcast with retry (GCR) block acknowledgement (BA) agreement. The process 1500 includes identifying (1504), by the AP MLD, respective communication links by which the AP MLD is communicatively coupled with the non-AP MLDs. The process 1500 includes transmitting (1506), by the AP MLD, the data frame on each of the respective communication links. The process 1500 includes transmitting (1508), by the AP MLD based on the transmission of the data frame, a BA request (BAReq) on respective ones of the communication links to the non-AP MLDs. In some implementations, the first frame and the second frame are related to block acknowledgement (BA).

In some implementations, the process 1500 includes transmitting, to the non-AP MLD, a group cast frame (GCF) wherein a transmit address (TA) field of the GCF is equivalent to the MLD_address of an AP MLD. In some implementations, the process 1500 includes transmitting, to the non-AP MLD, the first frame and the second frame based on a groupcast packet number (PN_gc) assigned by a common PN space used by the transmission of group addressed frames over both the first communications link and the second communications link. In some implementations, the process 1500 includes transmitting the first frame and the second frame based on a shared sequence number space (SNS) that is shared between the first communications link and the second communications link.

Figure 16:
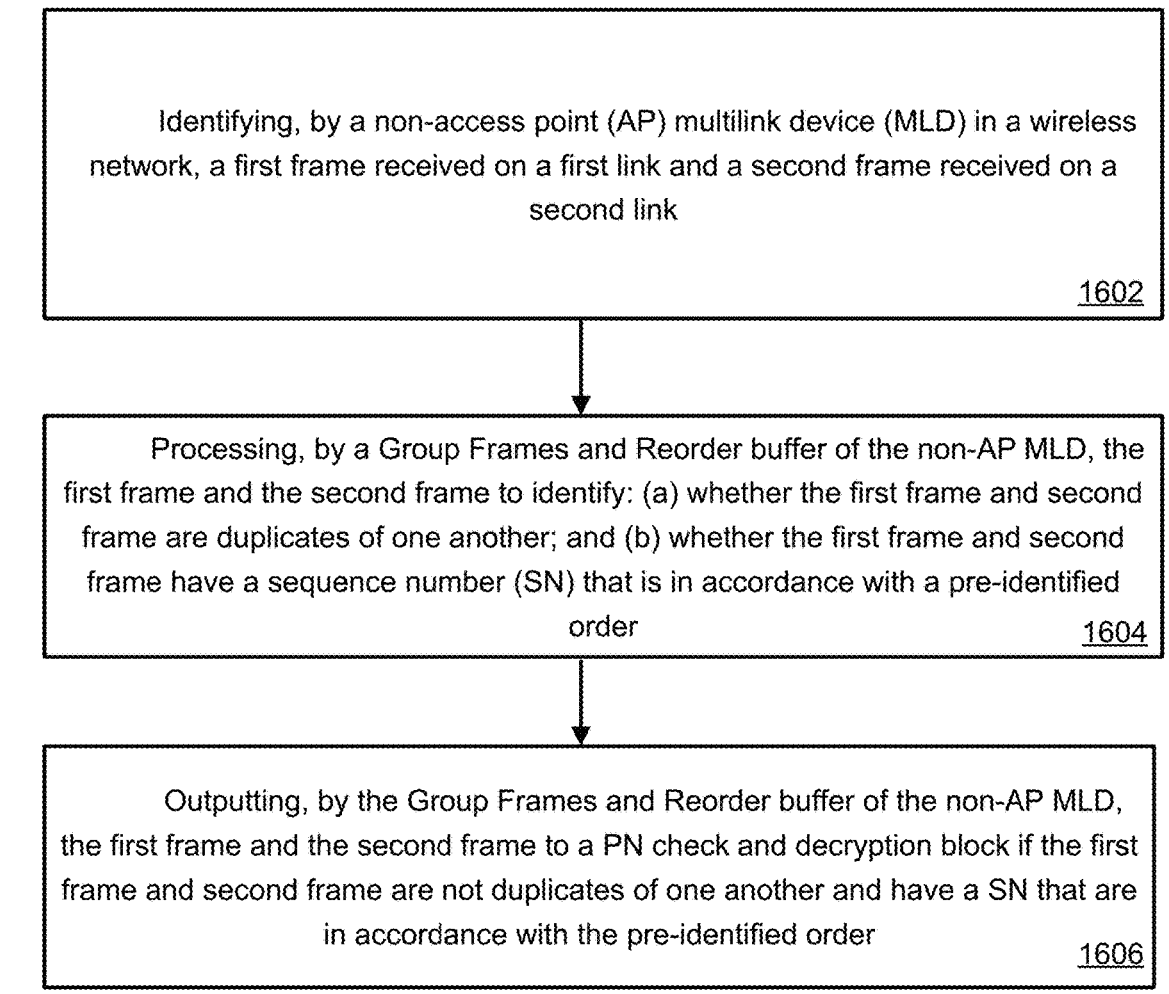
FIG. 16 depicts a flow diagram showing an example process for group addressed frame delivery over multi-link systems.

FIG. 16 depicts a flow diagram showing an example process 1600 for group addressed frame delivery over multi-link systems. The process 1600 includes identifying (1602), by a non-access point (AP) multilink device (MLD) in a wireless network, a first frame received on a first link and a second frame received on a second link. The process 1600 includes processing (1604), by a Group Frames and Reorder buffer of the non-AP MLD, the first frame and the second frame to identify: (a) whether the first frame and second frame are duplicates of one another; and (b) whether the first frame and second frame have a sequence number (SN) that is in accordance with a pre-identified order. The process 1600 includes outputting (1606), by the Group Frames and Reorder buffer of the non-AP MLD, the first frame and the second frame to a PN check and decryption block if the first frame and second frame are not duplicates of one another and have a SN that are in accordance with the pre-identified order.

In some implementations, the Group Frames and Reorder buffer identifies that the first frame and second frame have a SN that are in accordance with the pre-identified order if there is no missing frame with a smaller SN than the first frame or second frame. In some implementations, the non-AP MLD can receive group frames from one link (to save power) or from multiple links (to improve reliability). In some implementations, if STA receives group frames from a single AP and changes the AP from which it receives group frames, then the STA may use SN of the group frame to decide whether it has received all frames. In some implementations, the group frames are not transmitted exactly in the SN frame order. In some implementations, the Group Frames and Reorder buffer identifies that the first frame and second frame have a SN that are in accordance with the pre-identified order if the non-AP MLD has received a frame with higher SN that the first frame or second frame on all links from which it receives the first frame and the second frame. In some implementations, the process 1600 includes outputting, by the Group Frames and Reorder buffer of the non-AP MLD, the first frame and the second frame if the non-AP MLD is unable to store a received third frame in the Group Frames and Reorder buffer.

In the foregoing detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Embodiments herein are described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise.

EXAMPLES OF VARIOUS EMBODIMENTS

Example 1 includes a computer-implemented method comprising: identifying, by an access point (AP) multilink device (MLD) in a wireless network, a first sequence number space (SNS) that is to be used by the AP MLD to transmit data to a non-AP MLD over a first communications link and a second communications link, wherein frames with identical data that are transmitted over the first and second communications links will have an identical first SN based on the first SNS; identifying, by the MLD in the wireless network, the first SN based on the first SNS; and transmitting, by the AP MLD in the wireless network, a frame that includes the data to the non-AP MLD based on the first SN.

Example 2 includes the computer-implemented method of example 1, or some other example herein, wherein the first frame is a frame related to groupcast data (G-Data) for quality of service (QoS), groupcast with retry (GCR) data, G-Data not requiring QoS, groupcast management data generated at the multilink (ML) level, Groupcast management data generated by the first AP, unicast management data generated at the ML level, and possibly unicast management data generated by the AP and is intended for the non-AP MLD.

Example 3 includes the computer-implemented method of example 1, or some other example herein, wherein the SNS is independent of a traffic identifier value (TID) of the first frame for GCR-BA operation.

Example 4 includes the computer implemented method of example 1, or some other example herein, further comprising: identifying, by the MLD in the wireless network, a second SNS that is to be used by the MLD to transmit groupcast with retry block acknowledgment (GCR-BA) data over the first communications link and the second communications link, wherein identical frames on the first and second communications links that include identical GCR-BA data will have an identical second SN based on the second SNS; identifying, by the MLD in the wireless network, the second SN based on the second SNS; and transmitting, by the AP MLD in the wireless network, a frame that includes the GCR-BA data to the non-AP MLD based on the second SN.

Example 5 includes the computer implemented method of example 4, or some other example herein, the identification of the second SNS is based on a value of "address 1" of the frame that includes the GCR data.

Example 6 includes the computer implemented method of example 4, or some other example herein, wherein the second SNS is indexed by a traffic identifier (TID) value of the frame that includes the GCR data.

Example 7 includes the computer-implemented method of example 1, or some other example herein, further comprising: identifying, by the MLD in the wireless network, a third SNS that is to be used by the MLD to transmit unicast management data over the first and second communications links, wherein identical frames on the first and second communications links that include identical unicast management data will have an identical third SN based on the third SNS, where the identification of the third SNS is based on a value of "address 1" and frame type of the frame; identifying, by the MLD in the wireless network, the third SN based on the third SNS; and transmitting, by the AP MLD in the wireless network, a frame that includes the unicast management data to the non-AP MLD based on the third SN.

Example 8 includes a computer-implemented method comprising: identifying, by an access point (AP) multilink device (MLD) in a wireless network, a data frame that is to be transmitted to a plurality of non-AP MLDs subject to a groupcast with retry (GCR) block acknowledgement (BA) agreement; identifying, by the AP MLD, respective communication links by which the AP MLD is communicatively coupled with the non-AP MLDs; transmitting, by the AP MLD, the data frame on each of the respective communication links; and transmitting, by the AP MLD based on the transmission of the data frame, a BA request (BAReq) on respective ones of the communication links to the non-AP MLDs.

Example 9 includes the computer-implemented method of example 8, or some other example herein, wherein a different BAReq is transmitted for each of the non-AP MLDs, and wherein a BAReq for each of the non-AP MLDs is only transmitted on a single communication link.

Example 10 includes the computer-implemented method of example 8, or some other example herein, wherein a different BAReq is transmitted for each of the non-AP MLDs, and wherein a BAReq for each of the non-AP MLDs is transmitted on a plurality of the communication links.

Example 11 includes the computer-implemented method of example 8, or some other example herein, wherein the method further comprising receiving, from a non-AP MLD, a BA on a link on which a corresponding BAReq was transmitted to the non-AP MLD Example 12 includes a computer-implemented method comprising: identifying, by an access point (AP) in a wireless network, that a groupcast with retry (GCR) BlockAckReq is to be transmitted to one or more non-AP multilink devices (MLDs); identify, by the AP in the wireless network, a traffic identifier (TID) related to frames subject to a GCR-BA agreement; generate, by the AP in the wireless network, a frame that includes the GCR BlockAckReq and a TID_Info portion based on the TID; and transmit, by the AP in the wireless network, the generated frame.

Example 13 includes the computer-implemented method of example 12, or some other example herein, wherein the generated frame is to request TID-specific block acknowledgement (BA) from the non-AP MLDs.

Example 14 includes a computer-implemented method comprising: identifying, by an access point (AP) multilink device (MLD) in a wireless network, a first communications link and a second communications link by which the AP MLD is communicatively coupled with a non-AP MLD; identifying, by the AP MLD, a groupwise transient key (GTK); and transmitting, to the non-AP MLD, a first frame on the first communications link based on the GTK, and a second frame on the second communications link based on the same GTK.

Example 15 includes the computer-implemented method of example 14, or some other example herein, wherein the first frame and the second frame are related to block acknowledgement (BA).

Example 16 includes the computer-implemented method of example 14, or some other example herein, wherein the method further comprises transmitting, to the non-AP MLD, a group cast frame (GCF) wherein a transmit address (TA) field of the GCF is equivalent to the MLD_address of an AP MLD.

Example 17 includes the computer-implemented method of example 14, or some other example herein, wherein the method further comprises transmitting, to the non-AP MLD, the first frame and the second frame based on a groupcast packet number (PN_gc) assigned by a common PN space used by the transmission of group addressed frames over both the first communications link and the second communications link.

Example 18 includes the computer-implemented method of example 14, or some other example herein, wherein the method further comprises transmitting the first frame and the second frame based on a shared sequence number space (SNS) that is shared between the first communications link and the second communications link.

Example 19 includes a computer-implemented method comprising: identifying, by a non-access point (AP) multilink device (MLD) in a wireless network, a first frame received on a first link and a second frame received on a second link; processing, by a group frames and reorder buffer of the non-AP MLD, the first frame and the second frame to identify: (a) whether the first frame and second frame are duplicates of one another; and (b) whether the first frame and second frame have a sequence number (SN) that is in accordance with a pre-identified order; and outputting, by the group frames and reorder buffer of the non-AP MLD, the first frame and the second frame to a PN check and decryption block if the first frame and second frame are not duplicates of one another and have a SN that are in accordance with the pre-identified order.

Example 20 includes the computer-implemented method of example 19, or some other example herein, wherein the group frames and Reorder buffer identifies that the first frame and second frame have a SN that are in accordance with the pre-identified order if there is no missing frame with a smaller SN than the first frame or second frame.

Example 21 includes the computer-implemented method of example 19, or some other example herein, wherein the non-AP MLD can receive group frames from one link (to save power) or from multiple links (to improve reliability).

Example 22 includes the computer-implemented method of example 19, or some other example herein, wherein if STA receives group frames from a single AP and changes the AP from which it receives group frames, then the STA may use SN of the group frame to decide whether it has received all frames.

Example 23 includes the computer-implemented method of example 22, or some other example herein, wherein the group frames are not transmitted exactly in the SN frame order.

Example 24 includes the computer-implemented method of example 19, or some other example herein, wherein the group frames and Reorder buffer identifies that the first frame and second frame have a SN that are in accordance with the pre-identified order if the non-AP MLD has received a frame with higher SN that the first frame or second frame on all links from which it receives the first frame and the second frame.

Example 25 includes the computer-implemented method of example 19, or some other example herein, wherein the method further comprises outputting, by the group frames and Reorder buffer of the non-AP MLD, the first frame and the second frame if the non-AP MLD is unable to store a received third frame in the group frames and reorder buffer.

Example 26 includes a computer-implemented method, wherein separate operation on AP MLD group casts group frames to legacy receivable format in some AP.

Example 27 includes the computer-implemented method of example 26, or some other example herein, wherein the AP MLD decides on which AP groupcasts the group management frames in legacy STA-receivable format.

Example 28 includes the computer-implemented method of example 26, or some other example herein, wherein the non-AP MLD signals in UL frame the AP(s) in AP that DL group cast the UL frame in legacy receivable format.

Example 29 includes the computer-implemented method of example 26, or some other example herein, wherein the AP parses the UL data frame and uses address information or payload to decide the AP that group casts the frame in legacy STA receivable format.

Example 30 includes the computer-implemented method of example 26, or some other example herein, wherein the AP sends UL data frames from legacy STA that it should group cast in legacy receivable format only in the AP that received the UL frame and in non-AP MLD receivable format in other Aps in AP MLD.

Example 31 includes a computer-implemented method comprising transmitting, by an access point (AP) multi-link device (MLD) group addressed management frames and group addressed data frames so that legacy stations (STAs) can receive the frames only from a single AP or from subset of APs, but non-AP MLDs can receive the group addressed frame in all links.

Example 32 includes the computer-implemented method of example 31, or some other example herein, wherein the group addressed frame is transmitted in a physical layer protocol data unit (PPDU) format that is receivable only by the non-AP MLDs.

Example 33 includes the computer-implemented method of example 31, or some other example herein, wherein the group addressed frames are transmitted in a new frame type that is understood only by the non-AP MLDs, and the legacy STAs are not able to understand the frame content.

Example 34 includes the computer-implemented method of examples 32 or 33 above, or some other example herein, wherein the new PPDU type and new frame contain information that identifies the AP(s) in AP MLD that is group casting the legacy receivable frame.

Example 35 includes the computer-implemented method of example 31, or some other example herein, wherein the AP transmits link-specific individually addressed management frames to a non-AP MLD.

Example 36 includes the computer-implemented method of example 31, or some other example herein, wherein the AP MLD unicasts a copy of all or selected group addressed frames to a non-AP MLD.

Example 37 includes the computer-implemented method of example 31, or some other example herein, wherein the non-AP MLD transmits an uplink (UL) unicast frame that requests AP MLD to DL group cast the UL frame to associated STAs in AP MLD.

Example 38 includes the computer-implemented method of example 37, or some other example herein, wherein the non-AP MLD signals in the UL unicast frame that signals to AP the set of APs in which the frame should be group casted in legacy receivable format.

Example 39 includes the computer-implemented method of example 37, or some other example herein, wherein the AP MLD is to parse the UL unicast frames that contain a frame that will be DL group casted by the AP.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

What is claimed is:

1. A computer-implemented method comprising:
identifying, by an access point (AP) multilink device (MLD) in a wireless network, a first sequence number space (SNS) that is to be used by the AP MLD to transmit data to a non-AP MLD over a first communications link and a second communications link, wherein frames with identical data that are transmitted over the first and second communications links will have an identical first SN based on the first SNS;
identifying, by the AP MLD in the wireless network, the first SN based on the first SNS; and
transmitting, by the AP MLD in the wireless network, a frame that includes the data to the non-AP MLD based on the first SN;
identifying, by the AP MLD in the wireless network, a second SNS that is to be used by the AP MLD to transmit groupcast with retry block acknowledgment (GCR-BA) data over the first communications link and the second communications link, wherein identical frames unicast on the first and second communications links that include identical GCR-BA data have an identical second SN based on the second SNS;

identifying, by the AP MLD in the wireless network, the second SN based on the second SNS; and transmitting, by the AP MLD in the wireless network, a frame that includes the GCR-BA data to the non-AP MLD based on the second SN.

2. The computer-implemented method of claim 1, wherein the frame is related to one or more of groupcast data (G-Data) for quality of service (QoS), groupcast with retry (GCR) data, G-Data not requiring QoS, groupcast management data generated at the multilink (ML) level, Groupcast management data generated by the first AP, unicast management data generated at a ML level, and possibly unicast management data generated by the AP and is intended for the non-AP MLD.

3. The computer-implemented method of claim 1, wherein the SNS is independent of a traffic identifier value (TID) of the frame for GCR-BA operation.

4. The computer implemented method of claim 1, the identification of the second SNS is based on a value of "address 1" of the frame that includes GCR data.

5. The computer implemented method of claim 1, wherein the second SNS is indexed by a traffic identifier (TID) value of the frame that includes GCR data.

6. The computer-implemented method of claim 1, further comprising:
identifying, by the AP MLD in the wireless network, a third SNS that is to be used by the AP MLD to transmit unicast management data over the first and second communications links, wherein identical frames on the first and second communications links that include identical unicast management data will have an identical third SN based on the third SNS, where the identification of the third SNS is based on a value of "address 1" and frame type of the frame;
identifying, by the AP MLD in the wireless network, the third SN based on the third SNS; and
transmitting, by the AP MLD in the wireless network, a frame that includes the unicast management data to the non-AP MLD based on the third SN.

7. A computer-implemented method comprising:
identifying, by an access point (AP) multilink device (MLD) in a wireless network, a data frame that is to be transmitted to a plurality of non-AP MLDs subject to a groupcast with retry (GCR) block acknowledgement (BA) agreement;
identifying, by the AP MLD, respective communication links by which the AP MLD is communicatively coupled with the non-AP MLDs;
transmitting, by the AP MLD, the data frame on each of the respective communication links; and
transmitting, by the AP MLD based on transmission of the data frame, a BA request (BAReq) on respective ones of the communication links to the non-AP MLD; and
wherein a different BAReq is transmitted for each of the non-AP MLDs.

8. The computer-implemented method of claim 7, wherein a BAReq for each of the non-AP MLDs is only transmitted on a single communication link.

9. The computer-implemented method of claim 7, wherein a BAReq for each of the non-AP MLDs is transmitted on a plurality of the communication links.

10. The computer-implemented method of claim 7, wherein the method further comprising receiving, from a non-AP MLD, a BA on a link on which a corresponding BAReq was transmitted to the non-AP MLD.

11. A computer-implemented method comprising:
identifying, by a non-access point (AP) multilink device (MLD) in a wireless network, a first frame received on a first link and a second frame received on a second link;
processing, by a group frames and reorder buffer of the non-AP MLD, the first frame and the second frame to identify:
(a) whether the first frame and second frame are duplicates of one another; and
(b) whether the first frame and second frame have a sequence number (SN) that is in accordance with a pre-identified order; and
outputting, by the group frames and reorder buffer of the non-AP MLD, the first frame and the second frame to a PN check and decryption block when the first frame and second frame are not duplicates of one another and have respective SNs that are in accordance with the pre-identified order.

12. The computer-implemented method of claim 11, wherein the group frames and reorder buffer identifies that the first frame and second frame have a SN that are in accordance with the pre-identified order when there is no missing frame with a smaller SN than the first frame or second frame.

13. The computer-implemented method of claim 11, wherein the non-AP MLD receives group frames from one link to save power or from multiple links to improve reliability.

14. The computer-implemented method of claim 11, wherein when a station (STA) receives group frames from a single AP and the STA changes the AP from which the STA receives group frames, the STA determines, based on a SN of the group frame, whether the STA has received all of the group frames.

15. The computer-implemented method of claim 14, wherein the group frames are not transmitted exactly in a frame order designated by the SN.

16. The computer-implemented method of claim 11, wherein the group frames and reorder buffer identifies that the first frame and second frame have respective SNs that are each in accordance with the pre-identified order when the non-AP MLD has received a frame with higher SN that the first frame or second frame on all links from which it receives the first frame and the second frame.

17. The computer-implemented method of claim 11, wherein the method further comprises outputting, by the group frames and reorder buffer of the non-AP MLD, the first frame and the second frame when the non-AP MLD is unable to store a received third frame in the group frames and reorder buffer.

18. The computer-implemented method of claim 11, wherein the first frame is related to one or more of groupcast data (G-Data) for quality of service (QoS), groupcast with retry (GCR) data, G-Data not requiring QoS, groupcast management data generated at the multilink (ML) level, groupcast management data generated by the first AP, unicast management data generated at a ML level, and unicast management data generated by the AP and is intended for the non-AP MLD.

19. The computer implemented method of claim 11, further comprising:
identifying, by the AP MLD in the wireless network, a SNS that is to be used by the AP MLD to transmit groupcast with retry block acknowledgment (GCR-BA) data over the first link and the second link, wherein identical frames on the first and second links that include identical GCR-BA data will have an identical second SN based on the SNS;

identifying, by the AP MLD in the wireless network, the second SN based on the second SNS; and transmitting, by the AP MLD in the wireless network, a frame that includes the GCR-BA data to the non-AP MLD based on the second SN.

\* \* \* \* \*